(12) United States Patent
Baraga et al.

(10) Patent No.: US 11,994,212 B2
(45) Date of Patent: May 28, 2024

(54) AUTOMATIC GEARBOX FOR A MOTOR VEHICLE AS WELL AS A MOTOR VEHICLE

(71) Applicant: MERCEDES-BENZ GROUP AG, Stuttgart (DE)

(72) Inventors: Michael Baraga, Stuttgart (DE); Markus Brandenburg, Esslingen (DE); Henrik Kalczynski, Stuttgart (DE); Nico Kronimus, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/016,028

(22) PCT Filed: Jun. 25, 2021

(86) PCT No.: PCT/EP2021/067575
§ 371 (c)(1),
(2) Date: Jan. 13, 2023

(87) PCT Pub. No.: WO2022/012905
PCT Pub. Date: Jan. 20, 2022

(65) Prior Publication Data
US 2023/0323948 A1    Oct. 12, 2023

(30) Foreign Application Priority Data

Jul. 15, 2020 (DE) ...................... 10 2020 004 244.9
Aug. 14, 2020 (DE) ...................... 10 2020 004 982.6

(51) Int. Cl.
*F16H 63/34* (2006.01)
*F16H 57/04* (2010.01)
(Continued)

(52) U.S. Cl.
CPC ..... *F16H 63/3483* (2013.01); *F16H 57/0436* (2013.01); *F16H 57/0446* (2013.01);
(Continued)

(58) Field of Classification Search
CPC ..... F16H 63/3416–3491; F16H 61/0206–0269
See application file for complete search history.

(56) References Cited

U.S. PATENT DOCUMENTS 9,261,188 B2    2/2016   Ruehle et al.
9,464,711 B2   10/2016   Lee et al.
(Continued)

FOREIGN PATENT DOCUMENTS

DE         10133468 C2 *   2/2003   ............... E03B 1/04
DE      102011105068 A1    7/2012
(Continued)

OTHER PUBLICATIONS

International Search Report and Written Opinion dated Sep. 27, 2021 in related/corresponding International Application No. PCT/EP2021/067575.
(Continued)

*Primary Examiner* — Ernesto A Suarez
*Assistant Examiner* — Lillian T Nguyen
(74) *Attorney, Agent, or Firm* — PATENT PORTFOLIO BUILDERS PLLC

(57) ABSTRACT

An automatic gearbox for a motor vehicle includes a lubricating or cooling device, a hydraulic pump having a first pump connection via which, in a forward operation of the hydraulic pump, the lubricating or cooling device can be supplied with a hydraulic fluid conveyed by the hydraulic pump during forward operation and thus flows through the first pump connection, and with a parking lock, which can be moved between an engaged state and a disengaged state and has a first operating space, into which the hydraulic fluid conveyed by the hydraulic pump during forward operation can be introduced so that the parking lock is hydraulically operable and an adjustment of the parking lock from one of the states into the other state can thereby be effected.

10 Claims, 1 Drawing Sheet

(51) Int. Cl.
  *F16H 61/00* (2006.01)
  *F16H 61/02* (2006.01)
  *F16H 61/30* (2006.01)
(52) U.S. Cl.
  CPC ....... *F16H 57/045* (2013.01); *F16H 57/0476* (2013.01); *F16H 61/0031* (2013.01); *F16H 61/0206* (2013.01); *F16H 61/30* (2013.01); *F16H 63/3433* (2013.01); *F16H 2061/0037* (2013.01)

(56) References Cited

U.S. PATENT DOCUMENTS

| 9,689,434 | B2 | 6/2017 | Baraga et al. | |
|---|---|---|---|---|
| 10,435,001 | B2 | 10/2019 | Möhlmann et al. | |
| 2004/0112696 | A1* | 6/2004 | Carlsson | F16H 3/093 188/361 |
| 2014/0260224 | A1* | 9/2014 | Harms | F16H 61/421 60/443 |
| 2018/0119816 | A1 | 5/2018 | Gollmer et al. | |
| 2022/0065273 | A1 | 3/2022 | Grethel et al. | |

FOREIGN PATENT DOCUMENTS

| DE | 102012016235 | A1 | | 2/2014 |
|---|---|---|---|---|
| DE | 102014114972 | A1 | | 6/2015 |
| DE | 102016011148 | A1 | | 3/2017 |
| DE | 102016115925 | A1 | | 3/2018 |
| DE | 102018112665 | A1 | * | 11/2019 |
| DE | 102018112665 | A1 | | 11/2019 |
| DE | 102018112670 | A1 | * | 11/2019 |
| DE | 102018112670 | A1 | | 11/2019 |
| DE | 102018130700 | A1 | | 6/2020 |
| EP | 2664826 | A1 | | 11/2013 |
| JP | 2014521897 | A | | 8/2014 |
| WO | 2016087018 | A2 | | 6/2016 |

OTHER PUBLICATIONS

Office Action dated May 12, 2021 in related/corresponding DE Application No. 10 2020 004 982.6.

Notice of Reasons for Refusal dated Jan. 29, 2024 in related/corresponding JP Application No. 2023-501049.

* cited by examiner

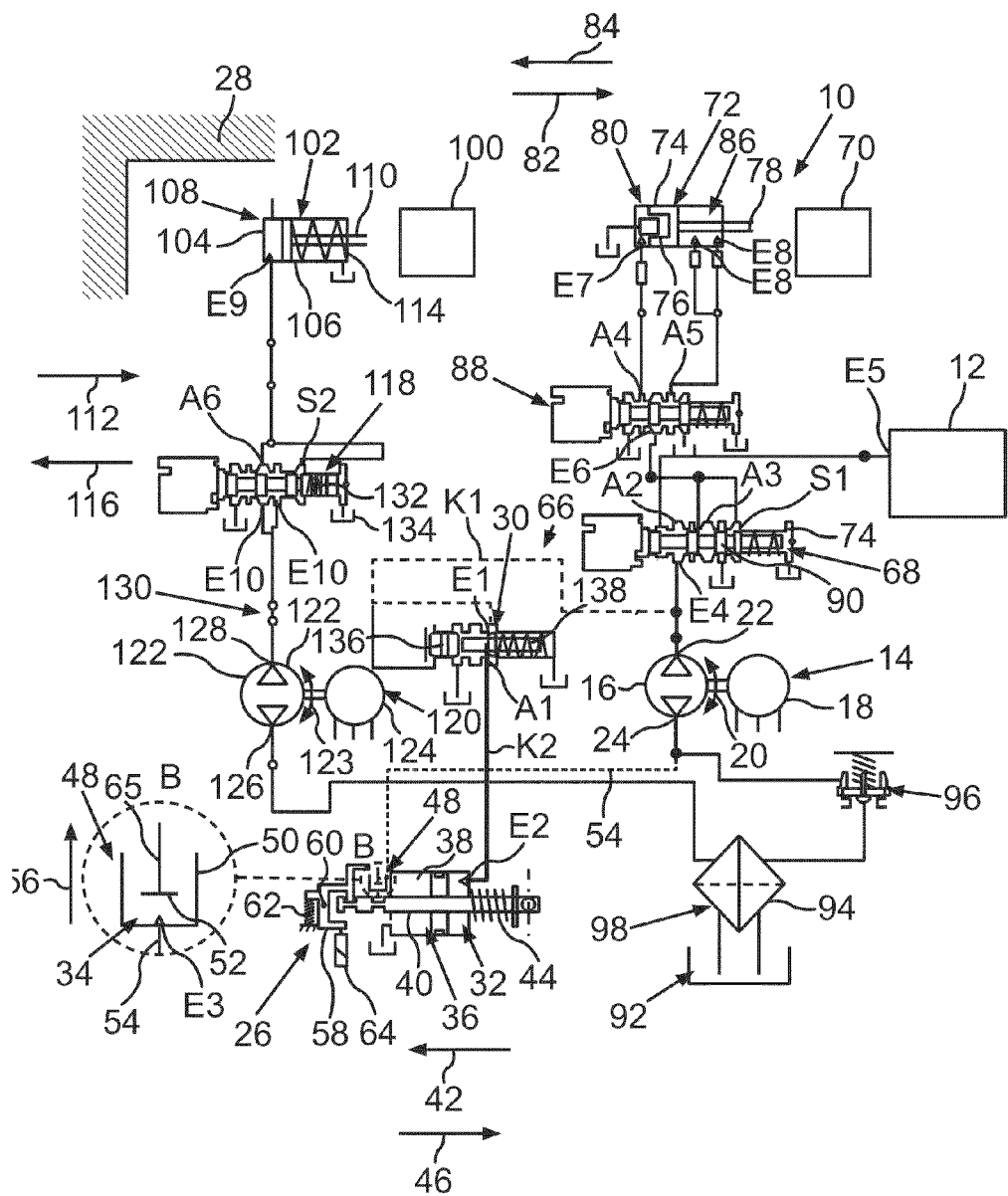

AUTOMATIC GEARBOX FOR A MOTOR VEHICLE AS WELL AS A MOTOR VEHICLE

BACKGROUND AND SUMMARY OF THE INVENTION

Exemplary embodiments of the invention relate to an automatic gearbox for a motor vehicle, in particular for a motor car, as well as to a motor vehicle, in particular a motor car with such an automatic gearbox.

DE 10 2018 112 665 A1 discloses a hydraulic device with a pump connected on one side to a coolant duct for supplying a first device with hydraulic fluid for its cooling and/or lubrication and is connected on the other side to an activation duct for supplying a second device with the same hydraulic fluid for its operation. The pump is configured as a reversible pump. It is also provided that a hydraulic parking lock actuator can specifically be connected with at least the coolant duct via a switching valve.

Hydraulic devices for motor vehicle gearboxes are also known from DE 10 2012 016 235 A1, US 2018/0119 816 A1, DE 10 2018 130 700 A1 and DE 10 2018 112 670 A1, which all comprise hydraulic actuators for parking lock devices.

DE 10 2016 115 925 A1 generically shows a hydraulic device with a hydraulic pump, which supplies a cooling and lubricating device with hydraulic fluid on one side, and which supplies a piston cylinder unit for actuating a parking lock with hydraulic fluid on the other side. The hydraulic device is thereby configured in such a way that, during a forward operation of the hydraulic pump, a piston of the piston cylinder unit is moved in one direction and, during a reverse operation of the hydraulic pump, the piston is moved in an opposite direction.

DE 10 2016 011 148 A1 also generically shows, via DE 10 2016 115 925 A1, that two different hydraulic cylinders combined with the two operating directions of the hydraulic pump can be provided for operating the parking lock.

DE 10 2014 114 972 A1 also shows a hydraulic system in which a low-pressure hydraulic pump is employed in addition to a high-pressure hydraulic pump, for supplying an operating cylinder of a switching element during a switching operation of the switching element.

Exemplary embodiments of the present invention are directed to an automatic gearbox for a motor vehicle as well as a motor vehicle with such an automatic gearbox, so that an especially reliable actuation of a parking lock of the automatic gearbox can be realized in an especially simple way.

A first aspect of the invention concerns an automatic gearbox for a motor vehicle, in particular for a motor car, for example formed as a passenger motor car. This means that the motor vehicle has the automatic gearbox, also simply referred to as the gearbox, in its fully manufactured state and can thereby be powered by a drive motor, for example formed as an internal combustion engine or as an electric motor, via the gearbox. Hereunder it should in particular be understood that at least one vehicle wheel, also simply referred to as a wheel, of the motor vehicle can be powered by the drive motor via the gearbox. In particular, at least, or exactly, two vehicle wheels can be powered by the drive motor via the gearbox, whereby the motor vehicle is powered. The automatic gearbox comprises a parking lock, the function of which is already sufficiently known from the general prior art and is therefore only briefly explained in the following. The gearbox has, for example, at least one gearbox housing, also simply referred to as the housing, and a shaft, which can, for example, be a driven shaft or output shaft of the gearbox. The shaft is at least partially arranged in the housing as well as being arranged rotatably relative to the housing. The gearbox can supply at least one torque, also referred to as an output torque or drive torque, for powering the motor vehicle, i.e., in particular for powering the wheel, via the shaft. As is further explained in detail in the following, the parking lock can be moved between an engaged and a disengaged state. The engaged state is also referred to as an activated state, and the disengaged state is also referred to as a deactivated state. This means that the parking lock is inserted or activated in the engaged state, wherein the parking lock is pulled out or deactivated in the disengaged state. The previously mentioned wheel or the previously mentioned wheels are, for example, in particular permanently, coupled in a torque-transmitting manner with the mentioned shaft so that, in relation to a torque flow from the shaft to the respective wheel, there is no separator arranged between the shaft and the respective wheel, which, for example, can be switched between a connected state coupled with the shaft, that transfers the respective wheel torque, and a separated state that decouples the respective wheel from the shaft. Furthermore, the motor vehicle, for example, has, in its fully manufactured state, an assembly that can, in particular, be formed as a self-supporting body and delimits an interior of the motor vehicle, also referred to as a passenger area or passenger compartment. People, such as, for example, the driver of the motor vehicle, can thereby stay in the interior. In the disengaged state, the parking lock releases the shaft for a rotation occurring around a shaft axis of rotation relative to the gearbox housing so that the shaft and also the respective wheel can rotate relative to the gearbox housing and relative to the assembly in the disengaged state. If the gearbox is thus, for example, powered in that a torque supplied by the drive motor is introduced into the gearbox, then the shaft is thereby rotated around the shaft axis of rotation relative to the gearbox housing in the disengaged state of the parking lock, and the wheels are powered by the shaft and thereby rotated relative to the assembly, whereby the motor vehicle is powered. However, in the engaged state, the shaft is secured against rotations occurring around the shaft axis of rotation relative to the gearbox housing by means of the parking lock, in particular in a positive-locking manner, so that in other words the shaft is non-rotatably connected with the gearbox housing, in particular in a positive-locking manner, by means of the parking lock in the engaged state or is very restricted in its rotatability occurring around the shaft axis of rotation relative to the housing by means of the parking lock, in particular in such a way that the shaft can rotate at most less than 90°, in particular at most less than 20° and especially particularly at most less than 10° around the shaft axis of rotation relative to the housing. The wheels are thereby also secured against a rotation occurring relative to the assembly, so that, for example, the motor vehicle undesirably rolling away can be prevented. This is then in particular advantageous if the motor vehicle is switched off or parked on an incline.

To this end, the parking lock has, for example, a parking gear connected non-rotatably with the shaft as well as, optionally, arranged on the shaft, which can have a toothing with several teeth following each other in the circumferential direction of the parking gear and tooth gaps arranged in between these. The parking lock also comprises, for example, a parking brake pawl, also simply referred to as a pawl, which is held pivotably on the housing. The pawl can, for example, be pivoted relative to the gearbox housing between a locked position and a release position. In the locked position, the pawl engages in a tooth gap, whereby the pawl fits with the parking gear in a positive-locking manner. The shaft is hereby secured against a rotation occurring around the shaft axis of rotation relative to the housing. In the release position, the pawl is disengaged from the tooth gaps. In other words, the pawl does not interact with the parking gear in the release position, so that the shaft can rotate around the shaft axis of rotation relative to the housing. The locked state thus, for example, causes the engaged state, wherein the release position causes the disengaged state of the parking lock.

The automatic gearbox also comprises a lubricating and/or cooling device, which is also referred to as a lubricating and/or cooling system. At least a part of the automatic gearbox can be lubricated and/or cooled by means of the lubricating and/or cooling device, in particular by using a lubricant and/or coolant. To this end, the lubricating and/or cooling device comprises, for example, a circuit through which the lubricant and/or coolant can flow, so that, for example, at least the previously mentioned part can be lubricated and/or cooled via the lubricating and/or cooling device by means of the lubricating and/or cooling fluid. The lubricant and/or coolant is, for example, an oil and/or a fluid that is liquid.

The automatic gearbox also comprises a hydraulic pump, which is preferably an electric hydraulic pump. By this should, in particular, be understood that the hydraulic pump is preferably electrically operable, i.e., can be operated by using electrical energy or electricity. For example, the hydraulic pump has a pump housing and a feed element arranged in the pump housing, which is movable, in particular rotatable, relative to the pump housing. The hydraulic pump then thereby comprises an electric motor, for example if it is formed as an electric hydraulic pump, which can be operated by means of electrical energy or electricity. By operating the electric motor, the feed element is powered by means of the electric motor and thereby moved, in particular rotated, relative to the pump housing. As is further explained in detail in the following, the hydraulic fluid can be conveyed by means of the hydraulic pump. The hydraulic fluid can, in particular, be conveyed by moving the feed element relative to the pump housing by means of the hydraulic pump, in particular by means of the feed element, in particular be conveyed through the pump housing and through the hydraulic pump. Preferably the hydraulic fluid is a liquid and thus a hydraulic liquid, wherein the hydraulic fluid can especially preferably be an oil or the previously mentioned oil. It is, in particular, conceivable that the hydraulic fluid is the previously mentioned lubricant and/or coolant, so that the hydraulic fluid is preferably used as the previously mentioned lubricant and/or coolant.

The hydraulic pump has a first pump connection, which can, for example, be a first pump output connection, in particular at least in a forward operating of the hydraulic pump. Via the first pump connection, during forward operation of the hydraulic pump, the lubricating and/or cooling device can be supplied with the hydraulic fluid that is conveyed by means of the hydraulic pump, in particular by means of the feed element, during forward operation and flows through the first pump connection, in particular in a first direction of flow. The hydraulic fluid is thus, for example in forward operation of the hydraulic pump, conveyed in the first direction of flow by means of the hydraulic pump and is thus conveyed, for example, through the first pump connection and/or through at least a part of the pump housing.

The parking lock can preferably have a parking lock valve, which has a valve output connection and a valve input connection. The valve input connection can be supplied with the hydraulic fluid that is conveyed by means of the hydraulic pump during forward operation via the first pump connection. In other words, the hydraulic pump is operated in forward operation, thus the hydraulic pump conveys the hydraulic fluid through the first pump connection, in particular in the first flow direction, whereby the hydraulic fluid flows through the first pump connection, in particular in the first flow direction. The hydraulic fluid that flows through the first pump connection can thereby flow from the first pump connection to the valve input connection of the parking lock valve and flow through the valve input connection and thus for example flow into the parking lock valve via the valve input connection. The hydraulic fluid that is conveyed by means of the hydraulic pump during forward operation can hereby be supplied to the parking lock valve via the valve input connection, so that the parking lock valve can be supplied or is supplied with the hydraulic fluid that is conveyed by means of the hydraulic pump during forward operation via the valve input connection.

The hydraulic fluid supplied to the parking lock valve via the valve input connection can be supplied to the valve output connection so that the valve output connection can be supplied with the hydraulic fluid supplied to the parking lock valve. By this can, in particular, be understood that the hydraulic fluid, which flows through the valve input connection and thereby flows into the parking lock valve, for example via the valve input connection, can flow from the valve input connection to the valve output connection, whereby the valve output connection is supplied with the hydraulic fluid. The hydraulic fluid that flowed from the valve input connection to the valve output connection can, for example, flow through the valve output connection and thereby, for example, flow out of the parking lock valve.

The parking lock thereby has a first operating space, into which the hydraulic fluid that is supplied to the valve output connection and conveyed by means of the hydraulic pump during forward operation can be introduced via the valve output connection. This means, in particular, that the hydraulic fluid, that is flowing from the valve input connection to the valve output connection and then for example flowing through the valve output connection and thus for example flowing out of the parking lock valve via the valve output connection, can flow into or flows into the first operating space, so that the hydraulic fluid flowing through the valve output connection can be introduced or is introduced into the first operating space. By introducing the hydraulic fluid into the first operating space, the parking lock is hydraulically operable or is hydraulically operated, whereby an adjustment of the parking lock from one of the states into the other state can be effected. By this can, in particular, be understood, for example, that the introduction of the hydraulic fluid into the first operating space causes, in particular directly causes, the adjustment of the parking lock from one state into the other state, so that for example the parking lock can be hydraulically adjusted or is hydraulically adjusted, in particular directly, from one state into the other state. It is furthermore conceivable that, by introducing the hydraulic fluid into the first operating space, the adjustment of the parking lock from one state into the other state is enabled or allowed, so that as a result the parking lock is adjusted from one state into the other state, for example not or not only hydraulically, but rather, for example, in particular also mechanically and thus, for example, in a spring-actuated manner and/or pneumatically.

In order to be able to achieve an especially reliable actuation or adjustment of the parking lock on demand in an especially simple and thus in particular cost, space, and weight-efficient way, it is initially provided, as is known in the prior art, that the hydraulic pump has a second pump connection. For example, the second pump connection is a second pump output connection, at least in a reverse operation of the hydraulic pump. In particular, by the respective pump output connection, the following can, for example, be understood: In forward operation, the hydraulic pump, for example, pumps the hydraulic fluid through the first pump connection, so that, for example, the hydraulic fluid flows out of the hydraulic pump via the first pump connection in forward operation, or so that the hydraulic pump supplies the hydraulic fluid via the first pump connection in forward operation, so that, for example, the first pump connection is on a discharge side of the hydraulic pump during forward operation. In reverse operation, the hydraulic pump, for example, pumps the hydraulic fluid through the second pump connection, so that, for example, the hydraulic fluid flows out of the hydraulic pump via the second pump connection in reverse operation, or so that the hydraulic pump supplies the hydraulic fluid via the second pump connection in reverse operation. Thus, the second pump connection is, for example, on the discharge side of the hydraulic pump during reverse operation. It is in particular conceivable that the hydraulic fluid flowing out from the hydraulic pump via the second pump connection is omitted in forward operation. Alternatively, or additionally, it can be provided that the hydraulic fluid flowing out of the hydraulic pump via the first pump connection is omitted in reverse operation.

As previously indicated, the hydraulic pump has the discharge side, for example in forward operation and in reverse operation. The hydraulic pump also has an intake side, for example in forward operation and in reverse operation. During forward operation and during reverse operation, the hydraulic pump, for example, pumps the hydraulic fluid from the intake side to the discharge side, so that the hydraulic pump, for example, pumps the hydraulic fluid into the hydraulic pump via the intake side, or sucks it into itself and supplies it via the discharge side or pumps it out of itself. It is thereby very preferably provided that, in forward operation, the first pump connection is arranged on the discharge side and the second pump connection is arranged on the intake side of the hydraulic pump.

Alternatively, or additionally, it is provided that, in reverse operation, the second pump connection is arranged on the discharge side and the first pump connection is arranged on the intake side of the hydraulic pump. It can thus be provided that, in forward operation, the hydraulic pump sucks or draws in the hydraulic fluid via the second pump connection and supplies it via the first pump connection or pumps it out and, in particular, pumps it away from itself. Alternatively, or additionally, it can be provided that, in reverse operation, the hydraulic pump sucks or draws in the hydraulic fluid via the first pump connection and supplies it via the second pump connection or pumps it out and thereby in particular pumps it away from itself. The hydraulic pump is thus preferably formed as a so-called reversible pump, the feed direction of which can be changed or reversed. For example, in forward operation, the hydraulic fluid flows through the first pump connection in the first direction of flow, and thereby in particular out of the hydraulic pump. In reverse operation, for example, the hydraulic fluid flows through the first pump connection in a second direction of flow that is opposite to the first direction of flow and thereby in particular into the hydraulic pump. In reverse operation, for example, the hydraulic fluid flows through the first pump connection in a third direction of flow and thereby, for example out of the hydraulic pump. In forward operation, for example, the hydraulic fluid flows through the second pump connection in a fourth direction of flow that is opposite to the third direction of flow and thereby in particular into the hydraulic pump. By forward operation and reverse operation, the following can in particular be understood: forward operation is a first mode of operation or a first type of operation of the hydraulic pump. In other words, forward operation is also referred to as the first mode of operation or first type of operation of the hydraulic pump. Reverse operation is a second mode of operation or a second type of operation of the hydraulic pump. In other words, reverse operation is also referred to as the second mode of operation or the second type of operation of the hydraulic pump. In forward operation or to achieve forward operation, the feed element is, in particular by means of the electric motor, moved, in particular rotated, relative to the pump housing in a first feed direction. Thus, the first feed direction can be a first direction of rotation. In reverse operation or to achieve reverse operation, the feed element is moved, in particular rotated, in a second feed direction that is opposite to the first feed direction. Thus, the second feed direction can be a second direction of rotation, that is opposite to the first direction of rotation.

The parking lock also has, as is likewise known on its own in the prior art, a second operating space, into which the hydraulic fluid that is conveyed by means of the hydraulic pump during reverse operation and thus flows through the second pump connection can be introduced via the second pump connection during reverse operation of the hydraulic pump. This means that the hydraulic fluid, which is conveyed by means of the hydraulic pump during reverse operation and thus flows through the second pump connection, in particular in the third direction of flow, can flow from the second pump connection to the and in particular into the second operating space, whereby the hydraulic fluid that is conveyed by means of the hydraulic pump during reverse operation can be introduced or is introduced into the second operating space. By introducing the hydraulic fluid into the second operating space, the parking lock can be hydraulically operated, whereby an adjustment of the parking lock from the other state into the one state can be effected. The previous and following embodiments of the first operating space, in particular in relation to the hydraulic operation of the parking lock that can be achieved using this, and the previous and following embodiments for adjusting the parking lock from the other state into one state can also simply be applied to the introduction of the hydraulic fluid into the second operating space and the hydraulic operation of the parking lock that can be effected using this as well as to adjust the parking lock from the other state into one state, and vice versa. It is clear that the hydraulic pump, also simply referred to as the pump, provides at least a dual function. First, the hydraulic pump is used to hydraulically operate the parking lock and thus to effect an adjustment of the parking lock from one state into the other state. Second, the hydraulic pump is used to hydraulically operate the parking lock and thus to effect an adjustment of the parking lock from the other state into one state. Consequently, for example hydraulic valves and additional pumps can be avoided or the number of hydraulic valves and pumps can be kept especially low, so that the costs, the installation space requirements, and the weight of the automatic gearbox can be kept to an especially small scale. At least one requirement is also created to achieve at least one or several redundancies in relation to the operation of the parking lock, so that an especially reliable operation can be achieved. In other words, a high system reliability can be created, by which it is, in particular, to be understood that the parking lock can then, for example, also still be operated if at least one other, further system for operating the parking lock has failed. It is provided according to the invention that the parking lock has a first hydraulic cylinder, which is configured for the hydraulic adjustment of the parking lock from one state into the other state, has the first operating space and is configured for the spring-actuated adjustment of the parking lock from the other state into the one state. An especially cost, space, and weight-efficient operation or adjustment of the parking lock can thereby be created.

Additionally, it is also provided according to the invention that the parking lock has a second hydraulic cylinder. The second hydraulic cylinder has the second operating space and can be hydraulically adjusted from an initial state to a released state, whereby the adjustment of the parking lock from the other state into the one state can be released, in particular can be effected. In the initial state, the second hydraulic cylinder for example allows that the parking lock remains in the other state. If the second hydraulic cylinder is adjusted from its initial state into its released state, then the second hydraulic cylinder enables an in particular spring-actuated adjustment of the parking lock from the other state into the one state.

In order to achieve an especially simple and thus cost, space, and weight-efficient construction of the automatic gearbox, it is provided in one embodiment of the invention that the second pump connection is directly fluidically connected with the second operating space. By this it is, in particular, to be understood that there is no valve element arranged in the direction of flow of the second operating space, flowing from the second pump connection to and into the operating space. A whole channel, which extends continuously or uninterrupted from the second pump connection up to the second operating space, by means of which the hydraulic fluid can be passed from the second pump connection to and into the second operating space, is thus preferably free of valves to influence a flow of the hydraulic fluid flowing through the channel and thus flowing from the second pump connection to the second operating space.

It has thereby been shown to be especially advantageous if the first hydraulic cylinder has a first housing, also referred to as a first hydraulic cylinder housing, and a first piston, also referred to as a first hydraulic cylinder piston. The first hydraulic cylinder is also referred to as a first piston cylinder unit. The first piston is arranged translationally movably in the first housing. The first housing is, for example, a cylinder or delimits a cylinder, wherein, for example, the first piston is arranged translationally movably in the first cylinder. By introducing the hydraulic fluid into the first operating space, the first piston can be translationally moved or is translationally moved relative to the first housing in a first direction of movement, whereby the parking lock can be hydraulically operated and can thus be or is thus, in particular, hydraulically adjusted from one state into the other state. The first hydraulic cylinder also has the first operating space, which is respectively partially delimited by the first piston and by the first housing, in particular directly in each case. If the hydraulic fluid is thus introduced into the first operating space, then the first piston is thereby, in particular directly, supplied with the hydraulic fluid. The first piston can thereby be translationally moved relative to the housing by means of the hydraulic fluid, in particular in the first direction of movement.

The first hydraulic cylinder also comprises a spring element, which is preferably a mechanical spring or a mechanical spring element. The spring element is thus preferably configured as a solid element and is not substantially formed by a gas or a liquid. The spring element can be or is tensioned by the movement of the first piston that occurs in the first direction of movement relative to the housing, whereby a spring force can be provided by means of the spring element or a spring force is provided by the spring element. By means of the spring force, the first piston can be or is translationally moved relative to the first housing, in a second direction of movement that is opposite to the first direction of movement. The spring force that is supplied by the spring element, which is preferably configured as a compression spring, thus preferably acts, for example, in the second direction of movement. The parking lock can be or is adjusted from the other state into the one state by movement of the first piston in the second direction of movement, which occurs translationally and relative to the first housing. The parking lock can be or is thus adjusted from the other state into one state in a spring-actuated or spring force-actuated manner. An especially reliable operation or adjustment of the parking lock can thereby be created in an especially simple way.

In order to thereby achieve an especially reliable operation of the parking lock on demand in an especially simple way, it is provided in a further embodiment of the invention that the second hydraulic cylinder has a second housing and a second piston. The second hydraulic cylinder also comprises the second operating space, which is, in particular directly, respectively partially delimited by the second housing and by the second piston. The second piston is, in particular directly, thus supplied with the hydraulic fluid, for example by the introduction of the hydraulic fluid into the second operating space. The second piston is arranged translationally movably in the second housing and is translationally movable from a locked or starting position that causes the initial state into a release position that causes the released state relative to the housing in a third direction of movement, by means of introducing the hydraulic fluid into the second operating space.

In order to achieve an especially simple and thus cost, space, and weight-efficient construction of the automatic gearbox, it is provided in a further embodiment of the invention that the automatic gearbox has a cooling valve, which is, in particular in relation to a flow of the hydraulic fluid, arranged or switched parallel to the parking lock valve. In other words, the cooling valve is fluidically arranged or switched parallel to the parking lock valve. The cooling valve can be supplied with the hydraulic fluid that is conveyed by means of the hydraulic pump during forward operation via the first pump connection, so that, for example, in forward operation the hydraulic fluid flowing through the first pump connection can be fed to the cooling valve and, in particular, can be introduced into the cooling valve or is introduced into the cooling valve. By supplying the cooling valve with the hydraulic fluid, the lubricating and/or cooling device can be supplied with the hydraulic fluid that is conveyed by means of the hydraulic pump during forward operation via the cooling valve. By this it can, in particular, be understood that the hydraulic fluid, which is conveyed by means of the hydraulic pump during forward operation, can flow to the lubricating and/or cooling device via the cooling valve and can in particular flow into the mentioned circuit of the lubricating and/or cooling device. An on-demand supply of the lubricating and/or cooling system, in particular of the circuit, can thereby be ensured in a cost and space-efficient way.

For example, the first pump connection is or can be fluidically connected with the lubricating and/or cooling device, in particular via the cooling valve, so that the hydraulic fluid can be supplied to the lubricating and/or cooling system (lubricating and/or cooling device) via the first pump connection and, if applicable, via the cooling valve. It is alternatively, or additionally, conceivable that the valve input connection is or can be fluidically connected, in particular directly or straight, to the first pump connection. Alternatively, or additionally, it can be provided that the valve output connection is or can be fluidically connected, in particular directly or straight, to the first operating space.

In order to keep the space requirements, the costs, and the weight of the automatic gearbox especially low and to thereby be able to achieve an advantageous driveability of the automatic gearbox, it is provided in a further embodiment of the invention that the automatic gearbox has at least one switching element. Two gear elements of the automatic gearbox can be slightly non-rotatably connected with each other by means of the switching element. For example, the switching element is a friction-fitting switching element such as a friction or multi-plate clutch. However, the switching element is preferably a positive-locking switching element, so that the switching element can, for example, be a claw or claw clutch. The switching element can, for example, be switched or adjusted between a coupled state and a decoupled state. In particular, the switching element can be moved, in particular relative to the gearbox housing and/or translationally between a decoupled position causing the decoupled state and a coupled position causing a coupled state. In the coupled state, the gear elements are non-rotatably connected with each other, in particular in a positive-locking manner, by means of the switching element, so that the gear elements can rotate relative to each other, in particular also not around a gear element axis of rotation, if the automatic gearbox is operated. However, in the decoupled state, the switching element releases the gear elements for a rotation occurring relative to each other and around the gear element axis of rotation, so that, for example, the gear elements do or can then, in particular, rotate around the gear element axis of rotation relative to each other if the automatic gearbox is activated. One of the gear elements is, for example, the gear housing or alternatively a component having toothing or can be configured as a gear wheel. The other gear element is, for example, a component having toothing, and thus, for example, can be configured as a gear wheel. In particular, the automatic gearbox can have at least one planetary gear set, which has at least one sun gear, at least one ring gear and at least one planetary support. The sun gear, the ring gear and the planetary support are components of the planetary gear set. One gear element and/or the other gear element can thereby be one of the components of the planetary gear set.

The automatic gearbox also has a third hydraulic cylinder. The second hydraulic cylinder is, for example, also referred to as the second piston cylinder unit. The third hydraulic cylinder can thus be referred to as the third piston cylinder unit. The third hydraulic cylinder can be supplied with the hydraulic fluid that is conveyed by means of the hydraulic pump during forward operation via the cooling valve, whereby the third hydraulic cylinder is operable and the switching element is operable via the third hydraulic cylinder. In other words, the third hydraulic cylinder can be or is, in particular, hydraulically operated by supplying the third hydraulic cylinder with the hydraulic fluid. By operating the third hydraulic cylinder, the switching element can be or is, in particular, hydraulically operated. By operating the switching element, the switching element can be adjusted or switched. In other words, by operating the switching element, the switching element can be switched from the coupled state into the decoupled state and/or from the decoupled state into the coupled state.

The cooling valve has a cooling valve input connection, which can be or is preferably fluidically connected, in particular directly, to the first pump connection. The cooling valve input connection can be supplied with the hydraulic fluid that is conveyed by means of the hydraulic pump during forward operation. In other words, the hydraulic fluid, which is conveyed by means of the hydraulic pump during forward operation, can be supplied to the cooling valve input connection and is thus, for example, introduced into the cooling valve via the cooling valve input connection, whereby the cooling valve input connection or the cooling valve can be or is supplied with the hydraulic fluid. By providing the cooling valve with the hydraulic fluid, the hydraulic fluid is supplied or can be supplied to the cooling valve. In other words, by providing the cooling valve input connection with the hydraulic fluid, the hydraulic fluid that is conveyed by means of the hydraulic pump during forward operation can be or is supplied to the cooling valve, whereby the cooling valve can be supplied or is supplied with the hydraulic fluid. By the preferably provided feature that the cooling valve input connection is directly fluidically connected with the first pump connection of the hydraulic pump, it can, in particular, be understood that a whole second channel, which extends continuously or uninterrupted from the first pump connection up to the cooling valve input connection, is free of a valve to influence a flow of the hydraulic fluid flowing through the second channel, wherein the hydraulic fluid should be fed from the first pump connection to the cooling valve input connection by means of the second channel. In the scope of this disclosure, a valve unit is to be understood by a or the respective, previously mentioned valve, which has at least one valve part, which can be adjusted or moved between a closed position, that fluidically locks at least a part of the flow cross-section that can be flowed through by the hydraulic fluid, and an open position, that releases the part. The cooling valve also comprises a first cooling valve output connection, which preferably is or can be fluidically connected with the third hydraulic cylinder. The third hydraulic cylinder can be supplied with the hydraulic fluid that is fed to the cooling valve via the cooling valve input connection and is conveyed by means of the hydraulic pump during forward operation via the cooling valve output connection. The hydraulic fluid that is conveyed by means of the hydraulic pump during forward operation can thus flow from the hydraulic pump, in particular from the first pump connection to the cooling valve and via the cooling valve to the third hydraulic cylinder, whereby the third hydraulic cylinder can be supplied or is supplied with the hydraulic fluid.

The cooling valve also has a second cooling valve output connection, which, for example, is or can be fluidically connected with the lubricating and/or cooling device. The lubricating and/or cooling device, in particular its circuit, can be supplied with the hydraulic fluid that is fed to the cooling valve via the cooling valve input connection and is conveyed by means of the hydraulic pump during forward operation via the second cooling valve output connection. In other words, the hydraulic fluid, which is conveyed by means of the hydraulic pump during forward operation and thus, for example, flows through the first pump connection, can flow from the first pump connection to the cooling valve and to the lubricating and/or cooling device via the cooling valve and thereby, in particular, flow into its circuit, whereby the lubricating and/or cooling device, in particular its circuit, can be supplied or is supplied with the hydraulic fluid that is conveyed by means of the hydraulic pump.

Finally, it has shown itself to be especially advantageous if the other state is the disengaged state and the one state is the engaged state. An especially reliable and robust operation of the automatic gearbox, in particular of the parking lock, can thereby be ensured, in an especially simple way.

A second aspect of the invention relates to a motor vehicle that is preferably formed as a motor car, in particular a passenger motor car, which comprises an automatic gearbox according to the first aspect of the invention. Advantages and previously named embodiments of the first aspect of the invention are to be seen as advantages and advantageous embodiments of the second aspect of the invention, and vice versa.

Further advantages, features and details of the invention arise from the following description of a preferred exemplary embodiment as well as based on the drawing. The features and combinations of features previously mentioned in the description as well as the features and combinations of features mentioned hereinafter in the drawing description and/or only shown in the one FIGURE cannot only be used in the respectively indicated combination, rather they can also be used in other combinations or alone, without leaving the scope of the invention.

BRIEF DESCRIPTION OF THE SOLE DRAWING

The sole drawing partially shows a schematic representation of an automatic gearbox according to the invention for a motor vehicle.

DETAILED DESCRIPTION

The sole FIGURE partially shows an automatic gearbox 10, also simply referred to as a gearbox, of a motor vehicle, which is preferably formed as a motor car, in particular as a passenger motor car, in a schematic representation. This means that the motor vehicle has the automatic gearbox 10 in its fully manufactured state. For example, the motor vehicle comprises a drive train in its fully manufactured state, by means of which the motor vehicle can be powered. The drive train thereby comprises, for example, a drive motor, which can be formed as an internal combustion engine or alternatively as an electric motor. The motor vehicle can thus, for example, be powered, in particular purely, electrically by means of the drive motor, so that the motor vehicle can preferably be formed as an electric vehicle, in particular as a battery electric vehicle (BEV). The motor vehicle can thereby be powered via the automatic gearbox 10 by means of the drive motor. The motor vehicle comprises, for example, at least two, in particular at least or exactly four, wheels, which are also referred to as vehicle wheels. The wheels are ground contact elements, via which the motor vehicle can be supported or is supported downwards in the vertical direction of the vehicle on the ground. At least four wheels, in particular the four wheels or all four wheels, can thereby, for example, be powered by means of the drive motor, via the gearbox. It is furthermore conceivable that at least or exactly two of the wheels can be powered by the drive motor via the automatic gearbox 10. By powering the wheels, the motor vehicle as a whole is powered.

The gearbox has a first shaft that is not depicted in the FIGURE, in the form of an input shaft, via which torques that the drive motor provides via its output shaft are introduced. The torques provided by the drive motor and introduced into the gearbox via the input shaft are also referred to as drive torques. The gearbox also has a second shaft that cannot be identified in the FIGURE, which is an output shaft of the gearbox. A respective torque, in the form of an output torque, can result from the respective drive torque, which the output shaft provides, or which is provided by the gearbox via the output shaft. For example, the gearbox has at least one gear or several, in particular at least or exactly two gears, wherein by gear is to be understood a transformation or transformation stage, by means of or according to which the respective drive torque and the respective output torque are transformed. The respective gear can thereby have a transformation that is different to 1 or alternatively a transformation of 1. The mentioned gears can preferably be switched. This means that the respective gear can be engaged and disengaged. If, for example, a first of the gears is engaged, then the second gear is or the remaining gears of the gearbox are disengaged. If, for example, the second is engaged, then the first gear is or the remaining gears of the gearbox are disengaged. For example, the gears are different in their respective transformations, by means of or according to which the respective drive torque is transformed into the respective output torque.

The automatic gearbox 10 has a lubricating and/or cooling device 12 that is especially schematically depicted in the FIGURE, by means of which at least one part of the automatic gearbox 10 and thus at least one component of the automatic gearbox 10 can be lubricated and/or cooled. To this end, the lubricating and/or cooling device 12, which is also referred to as the lubricating and/or cooling system or simply as the system, has a circuit that lubricant and/or coolant flows through. The lubricant and/or coolant is preferably a liquid, in particular an oil, and is also simply referred to as a fluid in the following. For example, the previously mentioned part can be lubricated and/or cooled via the system, by means of the fluid.

The automatic gearbox 10 also has a first hydraulic pump 14, which is formed as an electric pump and can thus be electrically operated. The hydraulic pump 14 has a feed element 16 and an electric motor 18, which can be operated by supplying the electric motor 18 with electrical energy or electricity. The hydraulic pump 14 also comprises a first pump housing that is not shown in detail in the FIGURE, in which the feed element 16 is arranged movably, in particular rotatably. By operating the electric motor 18, the electric motor 18 can power the feed element 16 and thus move, in particular rotate, relative to the first pump housing. A hydraulic fluid is conveyed by means of the feed element 16 by moving, in particular rotating, the feed element 16 relative to the first pump housing. Preferably, the hydraulic fluid is a liquid, wherein the hydraulic fluid can be the previously mentioned fluid or vice versa. In the FIGURE, it is illustrated by a double-headed arrow 20 that the electric motor 18 can move, in particular rotate, the feed element 16 relative to the first pump housing in a first feed direction and in a second feed direction that is opposite to the first feed direction. The hydraulic pump 14 is thus a reversible pump, which has a forward operation and a reverse operation. In other words, the hydraulic pump 14 can be operated in the mentioned forward operation and in the mentioned reverse operation. In order to operate the hydraulic pump 14 in the forward operation, the feed element 16 is moved relative to the first pump housing by means of the electric motor 18 in the first feed direction. In order to operate the hydraulic pump 14 in the reverse operation, the feed element 16 is moved, in particular rotated, relative to the first pump housing by means of the electric motor 18 in the second feed direction.

The hydraulic pump 14, in particular its first pump housing, has a first pump connection 22 and a second pump connection 24. The pump connection 22 is at least not a first pump output connection for forward operation. The pump connection 24 is at least a second pump output connection in reverse operation. In forward operation, the feed element 16 conveys the hydraulic fluid at least through a part of the first pump housing and thereby to the pump connection 22 and through the pump connection 22, so that the hydraulic fluid flows through the pump connection 22 in a first direction of flow in forward operation. For example, the pump connection 22 is a first pump input connection in reverse operation, since, for example, in reverse operation the feed element 16 feeds the hydraulic fluid through the pump connection 22 in a second direction of flow that is opposite to the first direction of flow, so that the hydraulic fluid flows through the pump connection 22 in the first direction of flow in forward operation, wherein the hydraulic fluid flows through the pump connection 22 in the second direction of flow in reverse operation.

The feed element 16 conveys the hydraulic fluid at least through one and/or the previously named part of the first pump housing and thereby to the pump connection 24 in reverse operation, wherein the feed element 16 conveys the hydraulic fluid through the pump connection 24 in a third direction of flow. The hydraulic fluid flows out of the first pump housing and thus out of the hydraulic pump 14 via the pump connection 22 in forward operation, and the hydraulic fluid flows, for example, into the first pump housing or into the hydraulic pump 14 via the pump connection 22 in reverse operation. The feed element 16 conveys, for example, the hydraulic fluid in a fourth direction of flow, that is opposite to the third direction of flow, through the pump connection 24 in forward operation, so that, for example, the hydraulic fluid flows out of the first pump housing and thus out of the hydraulic pump 14 via the pump connection 24 in reverse operation. The hydraulic fluid, for example, flows into the first pump housing or into the hydraulic pump 14 via the pump connection 24 in forward operation. The pump connection 24 is thus, for example, a second pump input connection in forward operation. The system (lubricating and/or cooling device 12) and thus in particular its circuit can be provided with the hydraulic fluid that is conveyed by means of the hydraulic pump during forward operation of the hydraulic pump 14 via the pump connection 22, so that the hydraulic pump 14 can convey the hydraulic fluid into the system and in particular into its circuit by its forward operation.

The automatic gearbox 10 also has a parking lock 26 that is illustrated especially schematically in the FIGURE, which can be adjusted between an engaged state and a disengaged state. In the engaged state, the parking lock 26 secures the output shaft of the automatic gearbox in a positive-locking manner against a full rotation occurring relative to the gearbox housing, so that, for example, the motor vehicle can then be secured against undesirably rolling away if it is parked on an incline. However, in the disengaged state, the parking lock 26 releases the output shaft for a, in particular free, rotation relative to the gearbox housing, so that in the disengaged state, the output shaft can rotate freely or fully several times relative to the gearbox housing. The gearbox housing is illustrated especially schematically in the FIGURE and is referred to with 28.

The parking lock 26 has a parking lock valve 30, which has a valve output connection A1 and a valve input connection E1. The valve input connection E1 can be supplied with the hydraulic fluid that is conveyed by means of the hydraulic pump 14 during forward operation via the first pump connection 22. In the exemplary embodiment shown in the FIGURE, the valve input connection E1 is directly fluidically connected with the pump connection 22, in particular via a channel K1 that is shown as a dotted line in the FIGURE and through which the hydraulic fluid can flow. By supplying the valve input connection E1 with the hydraulic fluid, the hydraulic fluid that is conveyed by means of the hydraulic pump 14 during forward operation can be supplied to the parking lock valve 30 via the valve input connection E1, so that, for example, the hydraulic fluid that is conveyed by means of the hydraulic pump 14 during forward operation flows into the parking lock valve 30 via the valve input connection E1.

The hydraulic fluid supplied via the valve input connection E1 can be supplied to the valve output connection A1. In other words, the hydraulic fluid can flow from the valve input connection E1 to the valve output connection A1, so that the valve output connection A1 can be supplied with the hydraulic fluid via the valve input connection E1. The parking lock 26 thereby has a first operating space 32, into which the hydraulic fluid that is supplied to the valve output connection A1 and is conveyed by means of the hydraulic pump 14 during forward operation can be introduced via the valve output connection A1. In the exemplary embodiment shown in the FIGURE, the valve output connection A1 is directly fluidically connected with the operating space 32. By introducing the hydraulic fluid into the operating space 32, the parking lock can be hydraulically operated, whereby an adjustment of the parking lock from the engaged into the disengaged state can herein be effected. In the exemplary embodiment shown in the FIGURE, the parking lock 26 is hydraulically operated and thus hydraulically configured, in that the hydraulic fluid is inserted into the operating space 32.

For example, the parking lock 26 comprises a pawl that is not shown in the FIGURE, which is at least indirectly, in particular directly, mounted on the gearbox housing 28, and can thereby be moved, in particular pivoted, relative to the gearbox housing 28 between a locked position and a release position. In the locked position, the pawl engages, for example, in a parking gear, which is connected non-rotatably with the output shaft. In the released state, the parking lock does not interact with the parking gear. The parking lock thereby secures the output shaft against a full rotation relative to the gearbox housing 28 in a positive-locking manner in the locked state. In the released state, the pawl releases the parking gear and thus the output shaft for rotations occurring relative to the gearbox housing 28. The parking lock 26 can comprise an operating element, for example, formed conically or as a cone, which is formed, for example, conically or frustoconically and can be moved translationally along a direction of the operating element, relative to the gearbox housing 28. In order, for example, to move the pawl from the release position into the locked position, the operating element is translationally moved in a locking direction, that runs parallel to the operating element, relative to the gearbox housing 28, as a result of which the pawl is moved from the release position into the locked position. By moving the pawl from the release position into the locked position, an, in particular, mechanical spring element is, for example, tensioned, whereby the mechanical spring element provides a spring force in the locked position. The spring force acts, for example, at least indirectly, in particular directly on the pawl. The pawl is thereby, for example, held in the locked position by means of the operating element against the spring force provided by the spring element, in particular in such a way that the operating element interacts with the pawl in a positive-locking manner, in particular engaging with the pawl. To allow that the spring force provided by the spring element moves or pivots the pawl from the locked position into the release position, the operating element is translationally moved relative to the gearbox housing 28 in a release direction that runs parallel to the direction of the operating element and is opposite to the locking direction. The operating element can thus be translationally moved to and fro relative to the gearbox housing 28 in the locking direction and in the release direction, in order to thereby effect a movement or pivoting of the pawl between the locked position and the release position. The locked position of the pawl thereby effects the engaged state of the parking lock 26, and the release position of the pawl effects the disengaged state of the parking lock 26.

In the FIGURE, an area B of the automatic gearbox 10 is shown magnified. It can thereby be identified that the parking lock 26 has a second operating space 34, into which the hydraulic fluid that is conveyed by means of the hydraulic pump 14 during reverse operation and that thereby flows through the second pump connection 24 can be introduced via the second pump connection 24 during reverse operation of the hydraulic pump 14. In the exemplary embodiment shown in the FIGURE, the pump connection 24 is directly fluidically connected with the second operating space 34. By introducing the hydraulic fluid into the second operating space 34, an adjustment of the parking lock 26 from the other state and in the present case from the disengaged state into one state and in the present case into the engaged state can be or is effected.

The parking lock 26 has a first hydraulic cylinder 36 configured for the hydraulic adjustment of the parking lock from the engaged state into the disengaged state, which has the first operating space 32 and is configured for the spring-actuated adjustment of the parking lock 26 from the disengaged state into the engaged state. To this end, the first hydraulic cylinder 36 comprises a first housing 38 and a first piston 40, also referred to as a locking piston, which is arranged at least partially translationally movably in the first housing 38. This means that the piston 40 is arranged at least partially in the first housing 38 and can be translationally moved relative to the housing 38. By introducing the hydraulic fluid that flows from the pump connection 22 via the parking lock valve 30 to the operating space 32 into the operating space 32, the piston 40 is translationally moved relative to the housing 38 in a direction of movement that is illustrated by an arrow 42 in the FIGURE. The parking lock 26 is hereby hydraulically operated and thereby disengaged. For example, the previously mentioned operating element is moved in the release direction, which, for example, coincides with the first direction of movement, by the movement of the piston 40 in the first direction of movement. From the FIGURE it can be identified that—while the valve input connection E1 is directly fluidically connected with the pump connection 22—the valve output connection A1 is directly fluidically connected with an input connection E2 of the first hydraulic cylinder 36, in particular of the housing 38. The first hydraulic cylinder 36 comprises the operating space 32, which is directly delimited, partially by the first piston 40 and partially by the first housing 38, respectively. The hydraulic fluid can thus flow from the valve output connection A1 to the input connection E2, flow through the input connection E2 and thus flow into the operating space 32 via the input connection E2, whereby the hydraulic fluid is introduced into the operating space 32. The piston 40 is hereby, in particular directly, acted upon by the hydraulic fluid flowing into the operating space 32, whereby the piston 40 is translationally moved relative to the housing 38 in the first direction of movement. The operating element is thereby moved in the release direction, whereby the parking lock 26 is disengaged or whereby a pulling out of the parking lock 26 is effected.

The first hydraulic cylinder 36 also comprises a mechanical spring element 44, which is coupled with the piston 40 on one side and is at least indirectly coupled with the housing 38 and/or with the gearbox housing 28 on the other side. By moving the piston 40 in the first direction of movement, the spring element 44 is tensioned. In the exemplary embodiment shown in the FIGURE, the spring element 44 is formed as a tension spring that is drawn, i.e., is extended in its length or extent that runs along the first direction of movement, if the piston 40 is moved in the first direction of movement. The spring element 44 thereby provides a spring force that acts in a second direction of movement, that is opposite to the first direction of movement and is illustrated by an arrow 46 in the FIGURE.

By means of the spring force provided by the spring element 44, the piston 40 can be translationally moved relative to the first housing 38 in the second direction of movement that is opposite to the first direction of movement, whereby the parking lock is spring actuated or operated by spring force. By moving the piston 40 in the second direction of movement, the previously mentioned operating element is, for example, moved in the locking direction, which coincides, for example, with the second direction of movement. By moving the operating element in the locking direction, the pawl is pivoted out of the release position into the locked position, whereby the parking lock 26 is engaged.

The parking lock 26 has a second hydraulic cylinder 48, which has the second operating space 34 and can be hydraulically adjusted from an initial state into a released state. In the initial state, the second hydraulic cylinder 48 allows the parking lock 26 to remain disengaged. In the released state, the second hydraulic cylinder 48 releases the spring-actuated engagement of the parking lock 26. The second hydraulic cylinder 48 therefore comprises a second housing 50 and a second piston 52, which is at least partially arranged in the second housing 50. The piston 52 can be translationally moved relative to the housing 50. It can be identified that the operating space 34 is directly fluidically connected with the pump connection 24 of the hydraulic pump 14 via a channel 54 that is also referred to as a P path and is illustrated in the FIGURE with a line that is partly dotted and partly solid. To this end, the second hydraulic cylinder 48, in particular the housing 50, has an input connection E3, which is directly fluidically connected with the pump connection 24, in particular via the channel 54.

The second operating space 34 of the second hydraulic cylinder 48 is directly delimited, partially by the second housing 50 and partially by the second piston 52, respectively. If the hydraulic pump 14 is operated in its reverse operation, then the hydraulic fluid is conveyed through the pump connection 24 by means of the hydraulic pump 14 and is conveyed through the channel 54 from the pump connection 24 and is thus conveyed via the channel 54 to the input connection E3, and is conveyed through the input connection E3, so that the hydraulic fluid flows into or is introduced into the operating space 23 via the input connection E3. The piston 52 is thereby directly supplied with the hydraulic fluid that flows into the operating space 34 in such a way that the second piston 52 can be moved or is moved translationally, relative to the second housing 50 in a third direction of movement that is illustrated by an arrow 56 in the FIGURE, from a locked or initial position, which causes the initial state of the second hydraulic cylinder 48, into a released position, which causes the released state of the second hydraulic cylinder 48.

The piston 40 has two recesses that are distanced from each other along the first direction of movement or along the second direction of movement. In the engaged state of the parking lock 26 the piston 40 is in an engaged position, and in the disengaged state of the parking lock 26 the piston 40 is in a disengaged position. In order to thus engage the parking lock 26 that is initially disengaged and is thus in the disengaged state. Therefore, to adjust or to transfer it from the disengaged state into the engaged state, the piston 40 is—as previously described—moved in the second direction of movement by means of the spring force provided by the spring element 44 and is thereby moved from the disengaged position into the engaged position. In order to disengage the initially engaged parking lock 26. Therefore, to adjust or to switch it from the engaged state into the disengaged state, the piston 40 is—as previously described—moved relative to the housing 38 in the first direction of movement by means of the hydraulic fluid that is introduced into the operating space 32 via the input connection E2 and is thereby moved from the engaged state into the disengaged position. The parking lock 26 thereby also comprises a locking element 58, which can be moved relative to the gearbox housing 28, between a locked position and an unlocked position. In particular, the locking element 58 can be pivoted relative to the gearbox housing 28 around a pivot axis 60, between the locked position and the unlocked position. If the piston 40 is in the engaged position while the locking element 58 is in the locked position, then the locking element 58 engages in a first of the recesses of the piston 40, whereby the locking element 58 interacts in a positive-locking manner with the piston 40. The piston 40 is thereby secured in a positive-locking manner against a movement from the engaged position into the disengaged position by means of the locking element 58. If the piston 40 is, for example, in the disengaged position while the locking element is in the locked position, then the locking element 58 engages in the second recess of the piston 40, whereby the locking element 58 interacts with the piston 40 in a positive-locking manner. The piston 40 is thereby held in the disengaged position, in particular against the spring force provided by the spring element 44, by means of the locking element 58 and is secured, in particular against a movement out of the disengaged position into the engaged position, in a positive-locking manner.

In order to be able to move the piston 40 out of the engaged position into the disengaged position or vice versa, from the disengaged position into the engaged position, the locking element 58 is moved, in particular pivoted, out of the locked position into the unlocked position. The positive locking interaction of the locking element 58 with the piston 40 is thereby lifted, so that the piston 40 can be moved from the engaged position into the disengaged position or from the disengaged position into the engaged position. By moving, in particular pivoting, the locking element 58 from the locked position into the unlocked position, a preferably mechanical spring element 62 of the parking lock 26 is tensioned, in particular compressed, so that, at least in the unlocked position, the spring element 62 provides a spring force. By means of the spring force, the locking element 58 can, then, in particular if the piston 40 is in the engaged position or in the disengaged position, be moved out of the unlocked position into the locked position and thereby be brought into engagement with the first or second recess.

In order to move the locking element 58 from the locked position into the unlocked position, in particular against the spring force provided by the spring element 62, the parking lock 26 comprises a, preferably electrically operable, actuator 64. In the exemplary embodiment shown in the FIGURE, the actuator 64 is formed as a solenoid. The solenoid has a housing and a rotor, which is at least partially driven out of the housing of the solenoid by supplying the solenoid with electrical energy. The locking element 58 is thereby moved, in particular pivoted, from the locked position into the unlocked position by means of the rotor.

By means of the second hydraulic cylinder 48, the locking element 58 can be hydraulically moved from the locked position into the unlocked position. By introducing the hydraulic fluid into the operating space 34, the piston 52 is moved out of the initial position that causes the initial state of the second hydraulic cylinder 48 into the released position that causes its released state, wherein the piston 52 is translationally moved relative to the housing 50 in the third direction of movement. By the movement of the piston 52 occurring in the third direction of movement from the initial state into the released position, a piston rod 65 of the second hydraulic cylinder 48, which moves with the piston 52, is driven at least a little out of the housing 50, whereby the locking element 58 is moved, in particular pivoted, out of the locked position into the unlocked position by means of the piston rod 65. The initial state of the second hydraulic cylinder 48 is thus an initial state of the second hydraulic cylinder 48 that keeps the locking element 58 in its locked position. Conversely, the released state of the second hydraulic cylinder 48 is a released state that causes the movement, in particular the pivoting, of the locking element 58 from the locked position into the unlocked position. In other words, the initial state is an initial state that leaves the parking lock 26 in particular engaged, wherein the released state of the second hydraulic cylinder 48 is a released state of the second hydraulic cylinder 48 that causes the engagement of the parking lock 26. The previously mentioned first recess and the features that the locking element 58 engages in the first recess in the engaged position of the piston 40 may be advantageous, but are to be viewed as optional and can be omitted so that the piston 40 has, for example, at least the previously mentioned second recess, which then functions as a securing recess, and wherein the locking element 58 then, if it is in the locking position and if the piston 40 is in the disengaged position, engages in the securing recess.

While the valve input connection E2 is directly fluidically connected with the pump connection 22 and the valve output connection A1 is directly fluidically connected with the input connection E2 and thus with the operating space 32, the input connection E2 or the operating space 32 is not directly connected with the pump connection 22, rather the input connection E2 or the operating space 32 is connected with the pump connection 22 via the parking lock valve 30. The automatic gearbox 10, in particular the parking lock 26, has an nP path 66 that is illustrated in the FIGURE by a line that is partly dotted, partly solid, in which the channel K1 is arranged. A further channel K2 is also arranged in the nP path 66, via which channel the input connection E2 is directly fluidically connected with the valve output connection A1. The nP path 66 thus extends, for example, from the pump connection 22 via the parking lock valve 30 or in particular through the parking lock valve 30 to the input connection E2, wherein the parking lock valve 30 is arranged between the pump connection 22 and the input connection E2 or the operating space 32 in the direction of flow of the hydraulic fluid flowing from the pump connection 22 into the operating space 32. The parking lock valve 30 can thereby, for example, be adjusted or switched between a separated state and a connected state. In the connected state, the input connection E2 or the operating space 32 is, for example, fluidically connected with the pump connection 22 via the parking lock valve 30, so that in the connected state, the input connection E2 and thus the operating space 32 can be supplied with the hydraulic fluid flowing through the pump connection 22 during forward operation via the parking lock valve 30. In the separated state, the input connection E2 or the operating space 32 is, for example, fluidically separated from the pump connection 22 by means of the parking lock valve 30, so that, for example during forward operation of the hydraulic pump 14, the hydraulic fluid that flows through the pump connection 22 during forward operation does not flow to or into the operating space 32.

The automatic gearbox 10 comprises a cooling valve 68 arranged parallel to the parking lock valve 30, which can be supplied with the hydraulic fluid that is conveyed by means of the hydraulic pump 14 during forward operation via the first pump connection 22. To this end, the cooling valve 68 has, for example, a cooling valve input connection E4, which is, in particular directly, fluidically connected with the pump connection 22. The hydraulic fluid that flows through the pump connection 22 during forward operation can thus, for example, flow to the cooling valve input connection E4 and flow through the cooling valve input connection E4 and thus, for example, flow into the cooling valve 68 via the cooling valve input connection E4. For example, the cooling valve 68 can be electrically switched or adjusted. In particular, the cooling valve 68 can be a magnetic valve. By supplying the cooling valve input connection E4 and thus the cooling valve 68 with the hydraulic fluid during forward operation, the lubricating and/or cooling device 12 can be supplied with the hydraulic fluid that is conveyed by means of the hydraulic pump 14 during forward operation via the cooling valve 68. To this end, the cooling valve 68 has, for example, a cooling valve output connection A2, which can be supplied with the hydraulic fluid with which the cooling valve 68 is supplied via the cooling valve input connection E4. This means that the hydraulic fluid that is conveyed by means of the hydraulic pump 14 during forward operation of the hydraulic pump 14 can flow from the cooling valve input connection E4 to the cooling valve output connection A2 and can flow through the cooling valve output connection A2 and can thus, for example, flow out of the cooling valve 68 via the cooling valve output connection A2. The hydraulic fluid that flows through the cooling valve output connection A2 can flow from the cooling valve output connection A2 to the system and in particular into its circuit, whereby the system and in particular its circuit are supplied with the hydraulic fluid. Here, the lubricating and/or cooling device 12, in particular an input connection E5 of the system, is, in particular directly, fluidically connected with the cooling valve output connection A2 of the cooling valve 68. The hydraulic fluid can therefore flow from the cooling valve output connection A2 to the input connection E5 and subsequently flow into the system, in particular its circuit, whereby the circuit is supplied with the hydraulic fluid.

Furthermore, the automatic gearbox 10 has at least one switching element 70, which is shown especially schematically in the FIGURE. The switching element 70 is preferably a positive-locking switching element and can thus be formed as a claw or a claw clutch. At least or exactly two gear elements of the automatic gearbox 10 can be non-rotatably connected with each other by means of the switching element 70. The switching element 70 can be switched or adjusted between a first coupled state and a first decoupled state. In the first coupled state, the gear elements are non-rotatably connected with each other by means of the switching element 70, so that the gear elements cannot rotate relative to each other, in particular also cannot if the automatic gearbox 10 is operated. In the first decoupled state, the switching element 70 releases the gear elements for a rotation that, in particular, occurs around a gear element axis of rotation and occurs relative to each other, so that the gear elements rotate or can rotate relative to each other, in particular then if the automatic gearbox 10 is operated. The automatic gearbox 10 has a third hydraulic cylinder 72 that is assigned to the switching element 70, which has a third housing 74 and a third piston 76. The third piston 76 is at least partially arranged in the housing 74 and can be translationally moved relative to the housing 74. The hydraulic cylinder 72 also comprises a piston rod 78, which can be translationally moved relative to the housing 74, with the piston 76. The housing 74 and the piston 76 delimit an operating chamber 80, into which the hydraulic fluid can be introduced. By introducing the hydraulic fluid into the operating chamber 80, the piston 76, and with this the piston rod 78, are translationally moved relative to the housing 74, in a first switching element direction, which is illustrated by an arrow 82 in the FIGURE. The piston 76, and with this the piston rod 78, can also, for example, be moved relative to the housing 74, in a second switching element direction that is opposite to the first switching element direction, wherein the second switching element direction is illustrated by an arrow 84. Here, the piston 76 and the housing 74 delimit, for example, respectively partially and respectively directly, a second operating chamber 86, which is opposite to the first operating chamber 80 along the first switching element direction or along the second switching element direction. If the hydraulic fluid is introduced into the operating chamber 86, then the piston 76, and with this the piston rod 78, are thereby moved relative to the housing 74 in the second switching element direction. It can be identified that by introducing the hydraulic fluid into the respective operating chamber 80 or 86, the piston 76 and thus the hydraulic cylinder 72 are hydraulically operated. By moving the piston 76 in the first switching element direction and in the second switching element direction, the switching element 70 is operated, i.e., adjusted or switched. For example, the switching element 70 that is initially in the first decoupled state is switched out of the first decoupled state into the first coupled state, because the piston 76 is moved in the first switching element direction. For example, the switching element 70 that is initially in the first coupled state is switched out of the first coupled state into the first decoupled state because the piston 76 is moved in the second switching element direction. As is explained in more detail in the following, the third hydraulic cylinder 72 can be supplied with the hydraulic fluid that is conveyed by means of the hydraulic pump 14 during forward operation via the cooling valve 68, whereby the third hydraulic cylinder 72, and via the third hydraulic cylinder 72, the switching element 70, can be operated. To this end, the cooling valve 68 has a second cooling valve output connection A3, which can be supplied with the hydraulic fluid that flows through the cooling valve input connection E4. In other words, the hydraulic fluid can flow from the cooling valve input connection E4 to the second cooling valve output connection A3, whereby the second cooling valve output connection A3 is supplied with the hydraulic fluid. The third hydraulic cylinder 72 can be supplied, via the second cooling valve output connection A3, with the hydraulic fluid that is supplied to the cooling valve via the cooling valve input connection E4 and is conveyed by means of the hydraulic pump 14 during forward operation.

The automatic gearbox 10 comprises a switching valve 88, which is arranged between the cooling valve 68, in particular the second cooling valve output connection A3, and the hydraulic cylinder 72, in particular of the respective operating chamber 80 or 86, in the direction of flow of the hydraulic fluid flowing from the cooling valve 68, in particular from the second cooling valve output connection A3, to the hydraulic cylinder 72 and from here into the respective operating chamber 80 or 86. The switching valve 88 has an input connection E6, which is, in particular directly, fluidically connected with the second cooling valve output connection A3.

The cooling valve 68 has a valve component 90 that can be moved, in particular, relative to a valve housing of the cooling valve 68 and/or translationally between a cooling position and an operating position. The cooling position creates a cooling state of the cooling valve 68, and the operating position creates an operating state of the cooling valve 68. In the cooling state, the cooling valve output connection A2 is fluidically connected with the cooling valve input connection E4, and the second cooling valve output connection A3 is preferably fluidically separated from the cooling valve input connection E4 by means of the valve component 90, so that the hydraulic fluid that flows through the cooling valve input connection E4 flows from the cooling valve input connection E4 to the cooling valve output connection A2 and from the cooling valve output connection A2 to or into the system, in particular while a flow of the hydraulic fluid from the second cooling valve output connection A3 to the switching valve 88 and via the switching valve 88 to and in particular into the hydraulic cylinder 72 does not occur. Again, expressed in other words, in the cooling state, also referred to as the cool state, supplying the hydraulic cylinder 72 and/or the switching valve 88 with the hydraulic fluid is, for example, omitted.

However, the second cooling valve output connection A3 is fluidically connected with the cooling valve input connection E4 in the operating state, while the cooling valve output connection A2 is preferably fluidically separated from the cooling valve input connection E4 by means of the valve component 90. The hydraulic fluid that flows through the cooling valve input connection E4 then flows from the cooling valve input connection E4 to the second cooling valve output connection A3 and from the second cooling valve output connection A3 to the input connection E6, while a flow of the hydraulic fluid from the cooling valve input connection E4 to the system (lubricating and/or cooling device 12) is preferably omitted. The switching valve 88 is thereby supplied with the hydraulic fluid that flows through the cooling valve input connection E4 in the operating state, while supplying the system with the hydraulic fluid that flows through the cooling valve input connection E4 is preferably omitted. The hydraulic fluid that flows from the second cooling valve output connection A3 to the input connection E6 in the operating state can, for example, flow into the switching valve 88 via the input connection E6. For example, the input connection E6 is, in particular directly, fluidically connected with the second cooling valve output connection A3.

The switching valve 88 can now, for example, be switched or adjusted between a first switching state and a second switching state. The switching valve 88 also has output connections A4 and A5. Furthermore, the hydraulic cylinder 72, in particular the housing 74, has an input connection E7 and at least one input connection E8. In the exemplary embodiment shown in the FIGURE, the hydraulic cylinder 72 has at least or exactly two input connections E8. The input connection E7 is, in particular directly, fluidically connected with the output connection A4, and the input connection E8 is, in particular directly, fluidically connected with the output connection A5. In the first switching state, the output connection A4 is, for example, fluidically connected with the input connection E6, while the output connection A5 is preferably fluidically separated from the input connection E6. The hydraulic fluid, which is, for example, conveyed by means of the hydraulic pump 14 during forward operation, and—as previously described—flows from the input connection E6 to the output connection A4 and flows through the output connection A4, can thereby flow from the output connection A4 to the input connection E7, flow through the input connection E7 and thus flow into the operating chamber 80 via the input connection E7, so that the hydraulic fluid is introduced into the operating chamber 80. As a result, the piston 76 and the piston rod 78 are moved in the first switching element direction. Preferably, the hydraulic fluid flowing into the operating chamber 86 via the input connection E8 is omitted in the first switching state.

In the second switching state, the output connection A5 is fluidically connected with the input connection E6, while the output connection A4 is preferably fluidically separated from the input connection E6. The hydraulic fluid that is conveyed by means of the hydraulic pump 14 during forward operation thus flows from the input connection E6 to the output connection A5 and through the output connection A5, and from the output connection A5 to the input connection E8. The hydraulic fluid can flow through the input connection E8 and consequently flow into the operating chamber 86 via the input connection E8, whereby the piston 76, and with this the piston rod 78, are translationally moved relative to the housing 74 in the second switching element direction. In the second switching state, the hydraulic fluid flowing into the operating chamber 80 via the input connection E7 is preferably omitted.

The valve component 90 is preferably electrically adjustable, i.e., is adjustable using electrical energy or electricity, in particular movable, and very preferably translationally movable, from the cooling position that causes the cooling state into the operating position that causes the operating state. The cooling valve 68 thus has a control connection S1, which is, in particular directly, fluidically connected with the second cooling valve output connection A3. The valve component 90 can be acted upon, in particular directly, by the pressure of the hydraulic fluid acting on the second cooling valve output connection A3 via the control connection S1 and can thereby be adjusted, in particular moved out of the operating position into the cooling position. The background here is that the hydraulic pump 14 can convey the hydraulic fluid into the respective operating chamber 80 or 86 via the cooling valve 68 and via the switching valve 88 in its forward operation, as long as and preferably only as long as the piston 76 thereby moves in the first switching element direction or in the second switching element direction. By moving the piston 76 and the piston rod 78 in the first switching element direction, the piston rod 78 is extended at least a little out of the housing 74, and by moving the piston 76 and the piston rod 78 in the second switching element direction, the piston rod 78 is retracted at least a little into the housing 74.

The piston 76 can move in the respective switching element direction as long as, and preferably only as long as, the piston 76 reaches a stop or until the switching element 70 is completely switched and thus, for example, has been completely moved into the first coupled state or into the first decoupled state. Conveying further hydraulic fluid into the respective operating chamber 80 or 86 is then also no longer possible by means of the hydraulic pump 14, so that the hydraulic pump 14 could come to a standstill. In order to avoid such an excessively long standstill of the hydraulic pump 14, the valve component 90 is moved out of the operating position into the cooling position, so that the hydraulic pump 14 can then no longer convey or no longer conveys the hydraulic fluid to the hydraulic cylinder 72 via the cooling valve 68 during forward operation, rather it can convey or conveys the hydraulic fluid to the system (lubricating and/or cooling device 12). In order to avoid such a standstill of the hydraulic pump 14 or to avoid an excessively long standstill of the hydraulic pump 14 and thus to move the valve component 90 especially quickly or an especially short time after the full operation or switching of the switching element 70 out of the operating position into the cooling position, the control connection S1 is, in particular directly, fluidically connected with the second cooling valve output connection A3. The hydraulic fluid can thus, in particular directly, act on the valve component 90 with the pressure acting on the second cooling valve output connection A3 via the control connection S1 and thus or thereby move or switch the valve component 90 out of the operating position into the cooling position.

It can be identified that in the cool state all of the hydraulic fluid conveyed by means of the hydraulic pump 14 during forward operation is supplied to the lubricating and/or cooling device 12 by means of the cooling valve 68. However, in the operating state, all of the hydraulic fluid that is conveyed by means of the hydraulic pump 14 during forward operation is supplied to the switching valve 88 by means of the cooling valve 68 and via this is supplied to the third hydraulic cylinder 72 and is thereby, in particular optionally, introduced into the operating chamber 80 or into the operating chamber 86. It can also be identified from the FIGURE that the automatic gearbox 10 has a sump 92, into which the hydraulic fluid can be or is received. During forward operation, the hydraulic pump 14 conveys the hydraulic fluid out of the sump 92, wherein, during forward operation, the hydraulic pump 14 in particular sucks the hydraulic fluid out of the sump 92. On its way from the sump 92 to and into the hydraulic pump 14, the hydraulic fluid flows through a filter 94, by means of which the hydraulic fluid is filtered on its way from the sump 92 to the hydraulic pump 14. This means that the filter 94 is arranged between the sump 92 and the hydraulic pump 14 in the direction of flow of the hydraulic fluid flowing from the sump 92 to the hydraulic pump 14, i.e., downstream from the sump 92 and upstream from the hydraulic pump 14. A one-way valve 96 is also arranged downstream from the sump 92 and upstream from the hydraulic pump 14 in the direction of flow of the hydraulic fluid flowing from the sump 92 to the hydraulic pump 14, which opens in the direction of the hydraulic pump 14 and closes in the opposite direction, and thus in the direction of the sump 92 or in the direction of the filter 94. The one-way valve 96 is thus arranged downstream from the filter 94 and upstream from the hydraulic pump 14 in the direction of flow of the hydraulic fluid flowing from the sump 92 to the hydraulic pump 14. It can be identified that the one-way valve 96 is arranged in a pipe element 98, by means of which the hydraulic fluid can be conveyed out of the sump 92 to the hydraulic pump 14. Here, the one-way valve 96 releases the pipe element 98 for a flow of the hydraulic fluid occurring through the pipe element 98 to the hydraulic pump 14 during forward operation of the hydraulic pump 14, so that the hydraulic pump 14 can suck or convey the hydraulic fluid out of the sump 92, in particular via the one-way valve 96 as well as, for example, via the filter 94, towards itself during its forward operation. However, the one-way valve 96 blocks the pipe element 98 for a flow of the hydraulic fluid occurring from the hydraulic pump 14, in particular from the pump connection 24, to the sump 92 via the one-way valve 96, so that the hydraulic fluid cannot flow from the hydraulic pump 14, in particular from the pump connection 24, back into the sump 92 via the one-way valve 96. The one-way valve 96 thus prevents the hydraulic fluid flowing from the hydraulic pump 14, in particular from the pump connection 24, via the one-way valve 96 to and into the sump 92 during reverse operation, so that the hydraulic fluid that is conveyed by means of the hydraulic pump 14 during reverse operation flows from the pump connection 24 into and through the channel 54 (P path) and flows into the operating space 34 via the P path during reverse operation. Consequently, the engagement of the parking lock 26 is caused or released.

Furthermore, the automatic gearbox 10 has a second switching element 100, which is provided in addition to the switching element 70. The switching element 100, which is especially schematically illustrated in the FIGURE, is, for example, a friction-locking switching element. The switching element 100 can, in particular, be formed as a friction or multi-plate clutch. At least or exactly two elements of the automatic gearbox 10 can, for example, be non-rotatably connected with each other by means of the switching element 100. The gearbox housing 28 can be a first of the elements, wherein the second element is, for example, an element with a toothing or is formed as a gear wheel. Furthermore, the second element can, for example, be a shaft. The switching element 100 can be adjusted or switched between a second coupled state and a second decoupled state. In the second coupled state, the elements are non-rotatably connected with each other by means of the switching element 100 so that the elements then, in particular, also do not rotate or cannot rotate relative to each other, if the automatic gearbox 10 is operated. However, in the second decoupled state, the switching element 100 releases the elements for a rotation occurring relative to each other and, for example, via an element axis of rotation, so that the elements, in particular, then rotate or can rotate relative to each other around the element axis of rotation if the automatic gearbox 10 is operated. The automatic gearbox 10 comprises a fourth hydraulic cylinder 102 that can be operated, in particular hydraulically. The switching element 100 can be operated or is operated, in particular hydraulically, by operating the hydraulic cylinder 102. By operating the switching element 100, the switching element 100 can be switched or adjusted from the second coupled state into the second decoupled state and/or out of the second decoupled state into the second coupled state. It can be identified from the FIGURE that the hydraulic cylinder 102 has a fourth housing 104 and a fourth piston 106, which is arranged at least partially in the housing 104 and can be translationally moved relative to the housing 104. The housing 104 and the piston 106 delimit a third operating chamber 108 of the hydraulic cylinder 102, each partially and each directly. By introducing the hydraulic fluid into the operating chamber 108, the piston 106 and with this a piston rod 110, which can be moved with the piston 106, of the hydraulic cylinder 102 are translationally moved relative to the housing 104, in a third switching element direction, that is illustrated by an arrow 112 in the FIGURE.

By moving the piston 106 and the piston rod 110 in the third switching element direction, the piston rod 110 is extended at least a little out of the housing 104. By moving the piston 106 in the third switching element direction, the switching element 100 is, for example, switched out of the second decoupled state into the second coupled state. The hydraulic cylinder 102 here has an, in particular mechanical, spring element 114, which is or can be supported, for example, on one side at least indirectly, in particular directly, on the piston 106 in the third switching element direction and on the other side at least indirectly, in particular directly, on the housing 104 in the third switching element direction. Therefore, if the piston 106 is moved in the third switching element direction, then the spring element 114 is tensioned, in particular compressed, so that the spring element 114 provides a spring force, which acts, for example, in a fourth switching element direction that is opposite to the third switching element direction and is illustrated by an arrow 116 in the figure. The piston 106 and, with this, the piston rod 110 can be moved relative to the housing 104 in the fourth switching element direction by means of the spring force provided by the spring element 114. By moving the piston 106 in the fourth switching element direction, the switching element 100 is, for example, switched out of the second coupled state into the second decoupled state. Respectively, the reverse is of course conceivable. The hydraulic cylinder 102, in particular the housing 104, has an input connection E9, via which the hydraulic fluid can be introduced into the operating chamber 108. The operating chamber 108 is a further operating space to which the hydraulic fluid can be supplied.

The automatic gearbox 10 also comprises a second switching valve 118 and a second hydraulic pump 120, which is herein also formed as an electrically operable hydraulic pump. The previous and following embodiments of the hydraulic pump 14 can also be easily transferred to the hydraulic pump 120, and vice versa. The hydraulic pump 120 therefore also has a feed element 122 and an electric motor 124. The hydraulic pump 120 also has, for example, a second pump housing, in which the feed element 122 is arranged. The feed element 122 is movable, in particular rotatable, relative to the second pump housing. The electric motor 124 can be operated by supplying the electric motor 124 with electrical energy or electricity. By operating the electric motor 124, the electric motor 124 can power the feed element 122 and thereby move, in particular rotate, relative to the second pump housing. The hydraulic pump 120 here is preferably also formed as a reversible pump. The feed element 122 can thus preferably be moved, in particular rotated, relative to the second pump housing in a third feed direction, and the feed element 122 can be moved, in particular rotated, relative to the second pump housing in a fourth feed direction that is opposite to the third feed direction. The electric motor 124 is preferably both formed to move the feed element 122 in the third feed direction and also formed to move the feed element 122 in the fourth feed direction that is opposite to the third feed direction. Since the feed element 122 can be, for example, rotated in the respective feed direction, the third feed direction is, for example, a third direction of rotation, so that the fourth feed direction can be a fourth direction of rotation, that is opposite to the third direction of rotation. The hydraulic pump 120 can therefore also be operated in a forward operation and in a reverse operation. To realize the forward operation, the feed element 122 is moved in the third feed direction, to realize the reverse operation, the feed element 122 is moved in the fourth feed direction. In the FIGURE, a double-headed arrow 123 illustrates that the hydraulic pump 120 can also be operated in its forward operation and in its reverse operation, i.e., the feed element 122 can also be moved, in particular rotated, back and forward, i.e., in the third feed direction and in the fourth feed direction that is opposite the third feed direction.

It can be seen that the sump 92 is a shared sump for the hydraulic pumps 14 and 120, with which the hydraulic pumps 14 and 120 are or can be fluidically connected. The pump connection 24 is or can here be fluidically connected with the sump 92 via the one-way valve 96, in particular during forward operation. The hydraulic pump 120 has a third pump connection 126, which is or can be fluidically connected with the sump 92. The hydraulic pump 120 can thus suck or convey the hydraulic fluid out of the sump 92, via the pump connection 126, into itself or into its second pump housing in its forward operation, wherein the hydraulic fluid flows through the filter 94 on its way from the sump 92 to the pump connection 126 and thus to the hydraulic pump 120, and is therefore filtered by means of the filter 94. In its forward operation, the hydraulic pump 120 conveys the hydraulic fluid, which the hydraulic pump 120 conveys out of the sump 92 in its forward operation, from the pump connection 126 to a fourth pump connection 128 of the hydraulic pump 120. The hydraulic pump 120 also conveys the hydraulic fluid, which flows from the pump connection 126 to the pump connection 128, in its forward operation through the pump connection 128. It can be identified that the hydraulic pump 120 is arranged in a pipe element 130 of the automatic gearbox 10, wherein the hydraulic fluid conveyed by means of the hydraulic pump 120 in its forward operation flows through the pipe element 130 in a first direction of fluid flow during forward operation of the hydraulic pump 120 and is conveyed from the sump 92 via the hydraulic pump 120 to the switching valve 118 by means of the pipe element 130. In reverse operation, the hydraulic pump 120 conveys the hydraulic fluid, for example, from the pump connection 128 to the pump connection 126, so that, for example, in reverse operation, the hydraulic fluid that is conveyed by means of the hydraulic pump 120 during its reverse operation flows through at least one part of the pipe element 130 in a second direction of fluid flow that is opposite to the first direction of fluid flow.

The switching valve 118 has at least one input connection E10. In particular, the switching valve 118 can have at least or exactly two input connections E10. The input connection E10 is, in particular directly, fluidically connected with the pump connection 128. The hydraulic fluid, which is conveyed through the pump connection 128 by means of the hydraulic pump 120, can thus flow from the pump connection 128 to the input connection E10 and flow through the input connection E10 and thus, for example, flow into the switching valve 118 via the input connection E10.

The switching valve 118 furthermore has an output connection A6, which can, for example, be supplied with the hydraulic fluid that flows into the switching valve 118 via the input connection E10. The input connection E9 is, in particular directly, fluidically connected with the output connection A6, so that the hydraulic fluid that is supplied to the output connection A6, and consequently flows through the output connection A6 and thus, for example, flows out of the switching valve 118 via the output connection A6, can flow from the output connection A6 to the input connection E9 and consequently flow through the input connection E9 and can thus flow into the operating chamber 108 via the input connection E9.

The switching valve 118 has, for example, a second control connection S2, which is, in particular directly, fluidically connected with the output connection A6. The switching valve 118 also comprises, for example, a second valve component 132. The valve component 132 can, for example, be moved, in particular translationally, between at least one first position of the valve component and at least one second position of the valve component. The output connection A6 is, for example, fluidically connected with the input connection E10 in the first position of the valve component, so that the input connection E9 is fluidically connected with the input connection E10 via the switching valve 118. The hydraulic fluid that is conveyed by means of the hydraulic pump 120 during its forward operation can therefore be introduced into the operating chamber 108 in the first position of the valve component. In the second position of the valve component, the input connection E9 is, for example, fluidically separated from the input connection E10. For example, in the second position of the valve component, the input connection E9 is fluidically connected with a tank 134 via the switching valve 118, in particular via the output connection A6, so that the hydraulic fluid initially received into the operating chamber 108 can then be discharged out of the operating chamber 108 via the input connection E9 and the switching valve 118 and can be conveyed into the tank 134. The movement of the piston 106 in the fourth switching element direction can therefore, for example, be enabled, or, during the movement of the piston 106 in the fourth switching element direction, the piston 106 can convey the hydraulic fluid initially received into the operating chamber 108 out of the operating chamber 108, via the input connection E9 and in particular convey it into the tank, in particular via the input connection E9 and via the switching valve 118.

The valve component 132 can be—similarly to the control connection S1—acted upon, in particular directly, by a pressure of the hydraulic fluid that is exerted on the output connection A6, via the control connection S2, and can thereby be moved, in particular translationally, out of the first position of the valve component into the second position of the valve component. It is further conceivable that the valve component 132 can be moved into a third position of the valve component. In the third position of the valve component, the input connection E9 is, for example, fluidically separated from the tank 134 and from the input connection E10, so that, in particular in the third position of the valve component, hydraulic fluid flowing out of the operating chamber 108 by means of the switching valve 118 is avoided. In the third position of the valve component, the input connection E10 is, for example, fluidically connected with the tank 134, and the output connection A6 is preferably separated from the input connection E8 and from the tank 134 by means of the valve component 132, so that for example then, if the hydraulic pump 120 conveys the hydraulic fluid during its forward operation, while the valve component 132 is in its third position of the valve component, the hydraulic fluid is conveyed from the hydraulic pump 120 via the switching valve 118 into the tank 134 by means of the hydraulic pump 120 during its forward operation. Here, it is alternatively or additionally conceivable that, because the control connection S2 is, in particular directly, fluidically connected with the output connection A6, the valve component 132 that is, in particular, in the first position of the valve component can be acted upon, in particular directly, by the pressure of the hydraulic fluid that is exerted on the output connection A6 and can therefore be adjusted or moved out of the first position of the valve component into the third position of the valve component. If the switching element 100 has been completely switched or adjusted, so that no further hydraulic fluid can be conveyed into operating chamber 108 by means of the hydraulic pump 120, then a standstill of the hydraulic pump 120 or an excessively long standstill of the hydraulic pump 120 can, for example, therefore be avoided, since the valve component 132 is moved out of the first position of the valve component into the third position of the valve component directly or an especially short time after the complete switching or operating or shifting of the switching element 100, by means of the pressure that is applied to or exerted on the output connection A6 and acts, in particular directly, on the valve component 132 via the control connection S2. The hydraulic pump 120 thereby conveys the hydraulic fluid, via the input connection E10 and thus via the switching valve 118, to and into the tank 134, which is, for example, the sump 92, during its forward operation.

Overall, it can be identified that the pump connection 22 is, in particular directly, fluidically connected with the nP path 66, while the pump connection 24 is, in particular directly, fluidically connected with the P path (channel 54). The parking lock valve 30 is preferably formed as a slide switch. The parking lock valve 30 is optionally provided and can therefore be omitted, so that, for example, the pump connection 22 is then directly fluidically connected with the input connection E2 or with the operating space 32, in particular via the nP path 66. The parking lock valve 30 is, in particular, used in order to achieve a rapid emptying of the operating space 32. For example, a rapid emptying can therefore be achieved by means of the parking lock valve 30, in which emptying the hydraulic fluid initially received into the operating space 32 can, for example, be discharged from the operating space 32 via the parking lock valve 30 and, for example, be conveyed into a further tank or into the tank 134.

In the following, the explanation of the initially engaged parking lock 26 is described again, in summary: the actuator 64 that is, for example, formed as a solenoid disengages the piston 40, also referred to as the parking lock piston, because the actuator 64 moves the locking element 58 out of its locked position, into the unlocked position. The cooling valve 68 that is, for example, formed as a switching magnet valve, remains in its operating state or is switched into the operating state. The optionally provided parking lock valve 30, which is preferably formed as a slide switch, remains in its current state or switches in such a way that the input connection E1 and thus the nP path 66 or the channel K1 and in particular the pump connection 22 are fluidically connected with the operating space 32. The hydraulic pump 14 is run in its forward operation and thus conveys the hydraulic fluid, in particular from the sump 92, from the pump connection 24 to the pump connection 22 and from the pump connection 22 via the parking lock valve 30 into the operating space 32, whereby the piston 40 that is initially in its engaged position is moved, in particular pushed, out of the engaged position into the disengaged position. A mechanical locking of the pawl or of the parking lock 26, in particular effected by means of the operating element, is thereby released. Because the cooling valve 68 remains in the operating state or is switched into the operating state, a flow of the hydraulic fluid from the pump connection 22 into the channel K1 and thus into the operating space 32 can be ensured, and a flow of the hydraulic fluid from the pump connection 22 to and into the cooling valve 68 is avoided or at least kept low, since, for example, the switching element 70 is already completely switched and thus the corresponding operating chamber 80 or 86 is completely or maximally filled with hydraulic fluid, so that no more hydraulic fluid can be conveyed into the hydraulic cylinder 72 by means of the hydraulic pump 14 during its forward operation.

In the following, a first variant of the engagement of the initially disengaged parking lock 26 is described in summary. The first variant is a standard procedure for engaging the parking lock 26, wherein the standard procedure is then, for example, carried out or can be carried out, if the parking lock 26 or the automatic gearbox 10 is completely operational. Firstly, the actuator 64, which is, for example, formed as a solenoid disengages the piston 40, also referred to as the parking lock piston, in particular electromagnetically, in that the actuator 64 moves the locking element 58, which is initially in its locked position, into the unlocked position. The hydraulic pump 14 is operated in its reverse operation and thereby clears, for example, an operating side of the parking lock valve 30, in particular in a supporting manner. The mentioned side of the parking lock valve 30 is, in particular, to be understood to mean the following: the parking lock valve 30 can comprise a valve component 136 which can, for example, be adjusted, in particular moved and very particularly translationally moved, between a fourth position of the valve component and a fifth position of the valve component. The operating side is, for example, an operating side of the valve component 136. In the fourth position of the valve component, the input connection E1 is, for example, fluidically connected with the output connection A1, so that, in the fourth position of the valve component, the pump connection 22 is fluidically connected with the operating space 32 via the parking lock valve 30. However, in the fifth position of the valve component, the input connection E1 is, for example, fluidically separated from an output connection A1 by means of the valve component 136, so that, for example, in the fifth position of the valve component, the pump connection 22 is fluidically separated from the operating space 32 by means of the valve component 136. The fourth position of the valve component and the fifth position of the valve component are, together, also referred to as positions of the parking lock valve. If, for example, the valve component 136 is moved out of one of the positions of the parking lock valve into the other position of the parking lock valve, then for example an, in particular mechanical, spring element 138 is therefore tensioned, in particular compressed or drawn out. The spring element 138 thereby provides a spring force, by means of which the valve component 136 can be moved or is moved out of the other position of the parking lock valve into the position of the parking lock valve. During its forward operation, the hydraulic pump 14 now, for example, conveys the hydraulic fluid via the valve input connection E1 into the parking lock valve 30 and onto the previously mentioned operating side, which is a side of an operating surface of the valve component 136. The operating surface of the valve component 136 is thereby provided with the hydraulic fluid that is conveyed by means of the hydraulic pump 14 during its forward operation. The valve component 136 is thereby, for example, moved out of one position of the parking lock valve into the other position of the parking lock valve, in particular against the spring force provided by the spring element 138. If, for example, the conveying of the hydraulic fluid into the parking lock valve 30 ends on the operating side, then the spring element 138 can at least partially relax, so that the valve component 136 is moved out of the other position of the parking lock valve into the one position of the parking lock valve by means of the spring force provided by the spring element 138. Clearing the operating side should now, for example, be understood to mean that the hydraulic pump 14 conveys or pumps the hydraulic fluid initially received into the parking lock valve 30 on the operating side away from the parking lock valve 30 of the operating side during its reverse operation and therefore clears the operating side, in particular via the channel K1 and via the valve input connection E1. The hydraulic pump 14 also conveys the hydraulic fluid, for example from the parking lock valve 30 of the operating side, into the operating space 34 during its reverse operation, whereby pressure is built up in the operating space 34 and therefore on the piston 52, that is also referred to as the unlocking piston. Herein, the valve component 136 is moved out of the other position of the parking lock valve into the one position of the parking lock valve and thus, for example, into a normal position of the valve component 136 or of the parking lock valve 30 by means of the spring element 138, i.e., by means of the spring force provided by the spring element 138, whereby, for example, the input connection E2 and via this, the operating space 32, is fluidically connected with the previously mentioned further tank and/or with the tank 134 and/or with the sump 92, via the parking lock valve 30 and thus in particular via the output connection A1. The one position of the parking lock valve is therefore the previously mentioned fifth position of the valve component, in which the output connection A1 is preferably separated from the valve input connection E1 and/or the operating space 32 is fluidically connected with a reservoir via the valve output connection A1. The reservoir can be the previously mentioned further tank or the tank 134 and/or the sump 92. The hydraulic fluid that was initially received into the operating space 32 can thereby in particular then, if the piston 40 is moved in the second direction of movement, flow or be conveyed out of the operating space 32 via the input connection E2 and the valve output connection A1, and flow into the reservoir. The spring element 44 can then thus move, in particular pull, the piston 40 in the second direction of movement, whereby the parking lock 26 is engaged.

Furthermore, a second variant of the engagement of the parking lock 26 is described in the following, wherein the second variant is provided redundantly to the first variant and is, for example, then carried out if the hydraulic pump 14 fails and is therefore not operational. The actuator 64 then unlocks the piston 40 or the locking element 58, in that the actuator 64 moves the locking element 58 out of its locked position, into its unlocked position. The spring element 138 of the parking lock valve 30 moves, in particular pushes or pulls, the valve component 136 into the other position of the parking lock valve, in particular into the fifth position of the valve component, whereby the operating space 32 is fluidically connected with the reservoir via the parking lock valve 30. Consequently, the spring element 44 can pull, in particular move, the piston 40 in the second direction of movement and into the engaged position, whereby the parking lock 26 is engaged. In the second variant, the reverse operation or an operation of the hydraulic pump 14 in general is, for example, thus omitted. It can be identified that the locking element 58 can be unlocked by means of the second hydraulic cylinder 48 and by means of the hydraulic pump 14. The locking element 58 can be electromagnetically or electrically unlocked by means of the actuator 64. In the second variant, the hydraulic unlocking of the locking element 58 is omitted or does not apply, the locking element preferably being exclusively electrically or electromagnetically unlocked in the second variant. Overall, it can be identified that the engagement of the parking lock 26 can occur redundantly. The hydraulic pump 14 can, for example, replace the actuator 64 in the event of the actuator 64 failing, and the actuator 64 can, for example, replace the hydraulic pump 14 in the event of the hydraulic pump 14 failing. A third variant of the engagement of the parking lock 26 can, for example, therefore be provided, wherein the third variant is then, for example, carried out if the actuator 64 has failed and thus cannot be operated. The third variant essentially corresponds to the first variant, wherein the electromagnetic unlocking of the locking element 58, which is or can be effected by means of the actuator 64, is then omitted, so that, in the third variant, the locking element 58 is, for example, then, in particular exclusively, hydraulically unlocked by means of the second hydraulic cylinder 48 and the hydraulic pump 14. An especially reliable operation of the parking lock 26 and thus of the automatic gearbox 10 can thereby be achieved in a simple way.

The operating side can be cleared in a supported manner by means of the reverse operation of the hydraulic pump 14. If the hydraulic pump 14 fails, so that the hydraulic pump 14 cannot convey the hydraulic fluid received onto the operating side away from the operating side, then the spring element 138 can, nevertheless or without the support of the hydraulic pump 14, move the valve component 136 into the one position of the parking lock valve, in particular into the fifth position of the valve component, since then, for example, the valve component 136 pushes the hydraulic fluid initially arranged on the operating side, for example, out of the parking lock valve 30 and, for example, conveys it into the previously mentioned reservoir, on its way from the other position of the parking lock valve into the one position of the parking lock valve, in particular into the fifth position of the valve component.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

REFERENCE NUMERALS LIST

10 Automatic gearbox
12 Lubricating and/or cooling device
14 Hydraulic pump
16 Feed element
18 Electric motor
20 Double-headed arrow
22 Pump connection
24 Pump connection
26 Parking lock
28 Gearbox housing
30 Parking lock valve
32 Operating space
34 Operating space
36 Hydraulic cylinder
38 Housing
40 Piston
42 Arrow
44 Spring element
46 Arrow
48 Second hydraulic cylinder
50 Housing
52 Piston
54 Channel
56 Arrow
58 Locking element
60 Pivot axis
62 Spring element
64 Actuator
65 Piston rod
66 nP path
68 Cooling valve
70 Switching element
72 Hydraulic cylinder
74 Housing
76 Piston
78 Piston rod
80 Operating chamber
82 Arrow
84 Arrow
86 Operating chamber
88 Switching valve
90 Valve component
92 Sump
94 Filter
96 One-way valve
98 Pipe element
100 Switching element
102 Hydraulic cylinder
104 Housing
106 Piston
108 Operating chamber
110 Piston rod
112 Arrow
114 Spring element
116 Arrow
118 Switching valve
120 Hydraulic pump
122 Feed element
123 Double-headed arrow
124 Electric motor
126 Pump connection
128 Pump connection
130 Pipe element
132 Valve component
134 Tank
136 Valve component
138 Spring element
A1-A6 Valve output connection
E1-E10 Valve input connection
K1, K2 Channel
S1, S2 Control connection

The invention claimed is:

1. An automatic gearbox for a motor vehicle, the automatic gearbox comprising:
   a lubricating or cooling device;
   a hydraulic pump having a first pump connection via which, during a forward operation of the hydraulic pump, the lubricating or cooling device is suppliable with a hydraulic fluid conveyed by the hydraulic pump during the forward operation and thus flows through the first pump connection, wherein the hydraulic pump has a second pump connection;
   a parking lock movable between an engaged state and a disengaged state and having a first operating space into which the hydraulic fluid conveyed by the hydraulic pump during the forward operation is introducible so that the parking lock is hydraulically operable to effect an adjustment of the parking lock from one of the engaged and disengaged states into the other one of the engaged and disengaged state, wherein the parking lock comprises
      a second operating space, into which the hydraulic fluid conveyed the hydraulic pump during a reverse operation and thus flows through the second pump connection is introducible via the second pump connection so that the parking lock is hydraulically operable and an adjustment of the parking lock from the other one of the engaged and disengaged state into the one of the engaged and disengaged state can thereby be effected,
      a first hydraulic cylinder configured to hydraulically adjust the parking lock from the one of the engaged and disengaged state into the other one of the engaged and disengaged state, wherein the first hydraulic cylinder has the first operating space and is configured for a spring-actuated adjustment of the parking lock from the other one of the engaged and disengaged state into the one of the engaged and disengaged state, and
      a second hydraulic cylinder having the second operating space and hydraulically adjustable from an initial state to a released state so that the adjustment of the parking lock from the other one of the engaged and disengaged state into the one of the engaged and disengaged state is releasable,
   a cooling valve configured to be supplied with the hydraulic fluid conveyed by the hydraulic pump during the forward operation via the first pump connection so that the lubricating or cooling device is suppliable with the hydraulic fluid conveyed by the hydraulic pump during the forward operation via the cooling valve;
   at least one switching element configured to non-rotatably connect two gear elements of the automatic gearbox with each other;
   a third hydraulic cylinder suppliable with the hydraulic fluid conveyed by the hydraulic pump during the forward operation via the cooling valve so that, via the third hydraulic cylinder, the switching element is operatable,
   wherein the cooling valve comprises
      a cooling valve input connection suppliable with the hydraulic fluid conveyed by the hydraulic pump during the forward operation so that the hydraulic fluid conveyed by the hydraulic pump during the forward operation is suppliable to the cooling valve to provide the cooling valve with the hydraulic fluid,
      a cooling valve output connection, via which the lubricating or cooling device is suppliable with the hydraulic fluid supplied to the cooling valve via the cooling valve input connection and conveyed by the hydraulic pump during the forward operation,
      a second cooling valve output connection, via which the third hydraulic cylinder is suppliable with the hydraulic fluid supplied to the cooling valve via the cooling valve input connection and conveyed by the hydraulic pump during the forward operation,
   wherein supplying the lubricating or cooling device, the third hydraulic cylinder, and a parking lock valve of the parking lock with hydraulic fluid respectively occurs exclusively by the hydraulic fluid conveyed during the forward operation of the hydraulic pump.

2. The automatic gearbox of claim 1, wherein the second pump connection is directly fluidically connected with the second operating space.

3. The automatic gearbox of claim 1, wherein the first hydraulic cylinder comprises:
   a first housing;
   a first piston, which is arranged translationally movably in the first housing and is configured to be translationally moved relative to the first housing in a first direction of movement by the introduction of the hydraulic fluid into the first operating space so that the parking lock is hydraulically operable and is adjustable from the one of the engaged and disengaged state into the other of the engaged and disengaged state,
   the first operating space, which is delimited partially by the first piston and partially by the first housing; and
   a spring element, which is to be tensioned to perform the spring actuated-adjustment by movement of the first piston that occurs in the first direction of movement, whereby a spring force can be provided by means of the spring element, by means of which force the first piston can be translationally moved relative to the first housing, in a second direction of movement that is opposite to the first direction of movement so that the parking lock is adjustable from the other one of the engaged and disengaged state into the one of the engaged and disengaged state.

4. The automatic gearbox of claim 1, wherein the second hydraulic cylinder comprises:
   a second housing; and
   a second piston,
   wherein the second operating space, which is partially delimited by the second housing and partially by the second piston, which is arranged translationally movably in the second housing and is translationally movable from a locked position causing the initial state into a release position that causes the released state relative to the second housing in a third direction of movement by introduction of the hydraulic fluid into the second operating space.

5. The automatic gearbox of claim 1, wherein the other state is the disengaged state and the one state is the engaged state.

6. A motor vehicle, comprising:
   wheels; and
   an automatic gearbox coupled to the wheels, wherein the automatic gearbox comprises
      a lubricating or cooling device;
      a hydraulic pump having a first pump connection via which, during a forward operation of the hydraulic pump, the lubricating or cooling device is suppliable with a hydraulic fluid conveyed by the hydraulic pump during the forward operation and thus flows through the first pump connection, wherein the hydraulic pump has a second pump connection;

a parking lock movable between an engaged state and a disengaged state and having a first operating space into which the hydraulic fluid conveyed by the hydraulic pump during the forward operation is introducible so that the parking lock is hydraulically operable to effect an adjustment of the parking lock from one of the engaged and disengaged states into the other one of the engaged and disengaged state, wherein the parking lock comprises a second operating space, into which the hydraulic fluid conveyed the hydraulic pump during a reverse operation and thus flows through the second pump connection is introducible via the second pump connection during the reverse operation of the hydraulic pump so that the parking lock is hydraulically operable and an adjustment of the parking lock from the other one of the engaged and disengaged state into the one of the engaged and disengaged state can thereby be effected, a first hydraulic cylinder configured to hydraulically adjust the parking lock from the one of the engaged and disengaged state into the other one of the engaged and disengaged state, wherein the first hydraulic cylinder has the first operating space and is configured for a spring-actuated adjustment of the parking lock from the other one of the engaged and disengaged state into the one of the engaged and disengaged state, and a second hydraulic cylinder having the second operating space and hydraulically adjustable from an initial state to a released state so that the adjustment of the parking lock from the other one of the engaged and disengaged state into the one of the engaged and disengaged state is releasable, a cooling valve configured to be supplied with the hydraulic fluid conveyed by the hydraulic pump during the forward operation via the first pump connection so that the lubricating or cooling device is suppliable with the hydraulic fluid conveyed by the hydraulic pump during the forward operation via the cooling valve;

at least one switching element configured to non-rotatably connect two gear elements of the automatic gearbox with each other;

a third hydraulic cylinder suppliable with the hydraulic fluid conveyed by the hydraulic pump during the forward operation via the cooling valve so that, via the third hydraulic cylinder, the switching element is operatable, wherein the cooling valve comprises a cooling valve input connection suppliable with the hydraulic fluid conveyed by the hydraulic pump during the forward operation so that the hydraulic fluid conveyed by the hydraulic pump during the forward operation is suppliable to the cooling valve to provide the cooling valve with the hydraulic fluid, a cooling valve output connection, via which the lubricating or cooling device is suppliable with the hydraulic fluid supplied to the cooling valve via the cooling valve input connection and conveyed by the hydraulic pump during the forward operation, a second cooling valve output connection, via which the third hydraulic cylinder is suppliable with the hydraulic fluid supplied to the cooling valve via the cooling valve input connection and conveyed by the hydraulic pump during the forward operation, wherein supplying the lubricating or cooling device, the third hydraulic cylinder, and a parking lock valve of the parking lock with hydraulic fluid respectively occurs exclusively by the hydraulic fluid conveyed during the forward operation of the hydraulic pump.

7. The motor vehicle of claim 6, wherein the second pump connection is directly fluidically connected with the second operating space.

8. The motor vehicle of claim 6, wherein the first hydraulic cylinder comprises:

a first housing;

a first piston, which is arranged translationally movably in the first housing and is configured to be translationally moved relative to the first housing in a first direction of movement by the introduction of the hydraulic fluid into the first operating space so that the parking lock is hydraulically operable and is adjustable from the one of the engaged and disengaged state into the other of the engaged and disengaged state, the first operating space, which is delimited partially by the first piston and partially by the first housing; and a spring element, which is to be tensioned to perform the spring actuated-adjustment by movement of the first piston that occurs in the first direction of movement, whereby a spring force can be provided by means of the spring element, by means of which force the first piston can be translationally moved relative to the first housing, in a second direction of movement that is opposite to the first direction of movement so that the parking lock is adjustable from the other one of the engaged and disengaged state into the one of the engaged and disengaged state.

9. The motor vehicle of claim 6, wherein the second hydraulic cylinder comprises:

a second housing; and a second piston, wherein the second operating space, which is partially delimited by the second housing and partially by the second piston, which is arranged translationally movably in the second housing and is translationally movable from a locked position causing the initial state into a release position that causes the released state relative to the second housing in a third direction of movement by introduction of the hydraulic fluid into the second operating space.

10. The motor vehicle of claim 6, wherein the other state is the disengaged state and the one state is the engaged state.

* * * * *